(12) United States Patent
Gronemeyer

(10) Patent No.: US 6,496,145 B2
(45) Date of Patent: *Dec. 17, 2002

(54) SIGNAL DETECTOR EMPLOYING COHERENT INTEGRATION

(75) Inventor: Steven A. Gronemeyer, Cedar Rapids, IA (US)

(73) Assignee: SiRF Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/971,297

(22) Filed: Oct. 4, 2001

(65) Prior Publication Data

US 2002/0036588 A1 Mar. 28, 2002

Related U.S. Application Data

(63) Continuation of application No. 09/281,566, filed on Mar. 30, 1999.

(51) Int. Cl.[7] .................................................. G01S 3/16
(52) U.S. Cl. .................. 342/378; 342/357.06; 375/208
(58) Field of Search ............... 342/89, 357.06, 342/378, 382; 701/213; 375/200, 208, 367

(56) References Cited

U.S. PATENT DOCUMENTS

| | | | |
|---|---|---|---|
| 3,604,911 A | 9/1971 | Schmitt | 235/181 |
| 3,975,628 A | 8/1976 | Graves et al. | 250/199 |
| 4,426,712 A | 1/1984 | Gorski-Popiel | 375/96 |
| 4,445,118 A | 4/1984 | Taylor et al. | 343/357 |
| 4,463,357 A | 7/1984 | MacDoran | 343/460 |
| 4,578,678 A | 3/1986 | Hurd | 343/357 |
| 4,667,203 A | 5/1987 | Counselman, III | 342/357 |
| 4,701,934 A | 10/1987 | Jasper | 375/1 |
| 4,754,465 A | 6/1988 | Trimble | 375/1 |
| 4,785,463 A | 11/1988 | Janc et al. | 375/1 |

(List continued on next page.)

FOREIGN PATENT DOCUMENTS

| | | |
|---|---|---|
| EP | 0511741 A1 | 11/1992 |
| EP | 0639901 A2 | 2/1995 |
| EP | 0511741 B1 | 11/1997 |
| EP | 0639901 A3 | 11/1998 |
| JP | 08/065205 | 3/1996 |
| JP | 08/065205 A | 3/2000 |
| WO | WO 92/13392 | 8/1992 |
| WO | WO 00/19644 | 4/2000 |

OTHER PUBLICATIONS

D. J. R. Van Nee and A. J. R. M. Coenen, "New Fast GPS Code–Acquistion Technique Using FFT," Jan. 17, 1991 *Electronics Letters*, vol. 27, No. 2.

*Primary Examiner*—Dao Phan
(74) *Attorney, Agent, or Firm*—Thomas, Kayden, Horstemeyer & Risley, LLP

(57) ABSTRACT

A signal detector is provided in which complex samples of a received signal are multiplied by data representative of a hypothesis, and the resulting product data is coherently integrated over a desired duration to provide correlation data representative of the level of correlation between the hypothesis and the signal. In one embodiment, the signal detector is part of a GPS receiver.

13 Claims, 15 Drawing Sheets

U.S. PATENT DOCUMENTS

| | | |
|---|---|---|
| 4,809,005 A | 2/1989 | Counselman, III .......... 342/352 |
| 4,821,294 A | 4/1989 | Thomas, Jr. ................. 375/96 |
| 4,890,233 A | 12/1989 | Ando et al. ................. 364/457 |
| 4,894,662 A | 1/1990 | Counselman ............... 342/357 |
| 4,894,842 A | 1/1990 | Broekhoven et al. .......... 375/1 |
| 4,992,720 A | 2/1991 | Hata ........................... 320/23 |
| 4,998,111 A | 3/1991 | Ma et al. .................... 342/357 |
| 5,014,066 A | 5/1991 | Counselman, III .......... 342/352 |
| 5,018,088 A | 5/1991 | Higbie ........................ 364/574 |
| 5,036,329 A | 7/1991 | Ando ......................... 342/357 |
| 5,043,736 A | 8/1991 | Darnell et al. .............. 342/357 |
| 5,108,334 A | 4/1992 | Eschenbach et al. ........ 455/314 |
| 5,148,042 A | 9/1992 | Nakazoe ..................... 307/65 |
| 5,153,591 A | 10/1992 | Clark .......................... 341/51 |
| 5,179,724 A | 1/1993 | Lindoff ....................... 455/76 |
| 5,202,829 A | 4/1993 | Geier ......................... 364/449 |
| 5,225,842 A | 7/1993 | Brown et al. ............... 342/357 |
| 5,253,268 A | 10/1993 | Omura et al. .................. 375/1 |
| 5,276,765 A | 1/1994 | Fremman et al. .............. 395/2 |
| 5,293,170 A | 3/1994 | Lorenz et al. ............... 376/309 |
| 5,293,398 A | 3/1994 | Hamao et al. ................. 375/1 |
| 5,297,097 A | 3/1994 | Etoh et al. .................. 365/226 |
| 5,311,195 A | 5/1994 | Mathis et al. ............... 342/357 |
| 5,323,164 A | 6/1994 | Endo .......................... 342/357 |
| 5,343,209 A | 8/1994 | Sennott et al. .............. 342/357 |
| 5,345,244 A | 9/1994 | Gildea et al. ............... 342/357 |
| 5,347,536 A | 9/1994 | Meehan ........................ 375/1 |
| 5,352,970 A | 10/1994 | Armstrong, II .............. 320/39 |
| 5,363,030 A | 11/1994 | Ford et al. ................... 320/13 |
| 5,378,155 A | 1/1995 | Eldridge ...................... 434/11 |
| 5,379,224 A | 1/1995 | Brown et al. ............... 364/449 |
| 5,396,515 A | 3/1995 | Dixon et al. ................ 375/208 |
| 5,402,346 A | 3/1995 | Lion et al. .................. 364/436 |
| 5,402,347 A | 3/1995 | McBurney et al. .......... 364/443 |
| 5,410,747 A | 4/1995 | Ohmagari et al. ........... 455/118 |
| 5,416,712 A | 5/1995 | Geier et al. ................. 364/450 |
| 5,418,818 A | 5/1995 | Marchetto et al. ........... 375/264 |
| 5,420,593 A | 5/1995 | Niles .......................... 342/357 |
| 5,440,313 A | 8/1995 | Osterdock et al. ........... 342/352 |
| 5,450,344 A | 9/1995 | Woo et al. ................... 364/449 |
| 5,498,239 A | 3/1996 | Galel et al. ..................... 604/95 |
| 5,504,684 A | 4/1996 | Lau et al. .................... 364/443 |
| 5,546,445 A | 8/1996 | Dennison et al. ............. 379/60 |
| 5,548,613 A | 8/1996 | Kahu et al. .................. 375/208 |
| 5,550,811 A | 8/1996 | Kahu et al. ................... 370/18 |
| 5,568,473 A | 10/1996 | Hemmati ..................... 370/18 |
| 5,577,023 A | 11/1996 | Marum et al. ................ 370/16 |
| 5,577,025 A | 11/1996 | Skinner et al. ............... 370/22 |
| 5,592,173 A | 1/1997 | Lau et al. .................... 342/357 |
| 5,594,453 A | 1/1997 | Rodal et al. ................. 342/357 |
| 5,608,722 A | 3/1997 | Miller ........................ 370/320 |
| 5,623,485 A | 4/1997 | Bi .............................. 370/209 |
| 5,625,668 A | 4/1997 | Loomis et al. ................ 379/58 |
| 5,640,429 A | 6/1997 | Michaels et al. ........... 375/340 |
| 5,640,431 A | 6/1997 | Bruckert et al. ............ 375/344 |
| 5,642,377 A | 6/1997 | Chung et al. ................ 375/200 |
| 5,644,591 A | 7/1997 | Sutton ........................ 375/200 |
| 5,649,000 A | 7/1997 | Lee et al. .................... 455/436 |
| 5,650,792 A | 7/1997 | Moore et al. ................ 343/725 |
| 5,654,718 A | 8/1997 | Beason et al. ............... 342/357 |
| 5,663,734 A | 9/1997 | Krasner ...................... 342/357 |
| 5,663,735 A | 9/1997 | Eshenbach .................. 342/357 |
| 5,689,814 A | 11/1997 | Hagisawa et al. ............. 455/69 |
| 5,722,061 A | 2/1998 | Hutchison, IV et al. . 455/245.1 |
| 5,734,674 A | 3/1998 | Fenton et al. ............... 375/207 |
| 5,734,966 A | 3/1998 | Farrer et al. .................. 455/63 |
| 5,737,329 A | 4/1998 | Horiguchi ................... 370/342 |
| 5,739,596 A | 4/1998 | Takizawa et al. .............. 30/66 |
| 5,749,067 A | 5/1998 | Barrett ........................ 704/233 |
| 5,781,156 A | 7/1998 | Krasner ....................... 342/357 |
| 5,784,695 A | 7/1998 | Upton et al. ................. 455/442 |
| 5,786,789 A | 7/1998 | Janky .......................... 342/357 |
| 5,812,087 A | 9/1998 | Krasner ....................... 342/357 |
| 5,825,327 A | 10/1998 | Krasner ....................... 342/357 |
| 5,828,694 A | 10/1998 | Schipper ..................... 375/208 |
| 5,831,574 A | 11/1998 | Krasner ....................... 342/357 |
| 5,832,021 A | 11/1998 | Kondo ........................ 375/200 |
| 5,841,396 A | 11/1998 | Krasner ....................... 342/357 |
| 5,845,203 A | 12/1998 | LaDue ........................ 455/414 |
| 5,854,605 A | 12/1998 | Gildea ........................ 342/357 |
| 5,862,465 A | 1/1999 | Ou ............................ 455/234.1 |
| 5,867,535 A | 2/1999 | Phillips et al. ............... 375/295 |
| 5,867,795 A | 2/1999 | Novis et al. ................. 455/566 |
| 5,872,540 A | 2/1999 | Casabona et al. ............ 342/362 |
| 5,874,914 A | 2/1999 | Krasner ....................... 342/357 |
| 5,877,724 A | 3/1999 | Davis .......................... 342/357 |
| 5,877,725 A | 3/1999 | Kalafus ....................... 342/357 |
| 5,881,371 A | 3/1999 | Reynolds ...................... 455/83 |
| 5,883,594 A | 3/1999 | Lau ............................. 342/357 |
| 5,884,214 A | 3/1999 | Krasner ....................... 701/207 |
| 5,889,474 A | 3/1999 | LaDue ..................... 340/825.49 |
| 5,903,654 A | 5/1999 | Milton et al. .................. 380/49 |
| 5,907,809 A | 5/1999 | Molnar et al. ............... 455/456 |
| 5,909,640 A | 6/1999 | Farrer et al. ................... 455/63 |
| 5,917,444 A | 6/1999 | Loomis et al. ............... 342/357 |
| 5,917,829 A | 6/1999 | Hertz et al. .................. 370/479 |
| 5,920,283 A | 7/1999 | Shaheen et al. ............. 342/357 |
| 5,923,703 A | 7/1999 | Pon et al. .................... 375/209 |
| 5,924,024 A | 7/1999 | Ikeda et al. .................. 455/313 |
| 5,926,131 A | 7/1999 | Sakumoto et al. ........... 342/357 |
| 5,936,572 A | 8/1999 | Loomis et al. ............... 342/357 |
| 5,943,363 A | 8/1999 | Hanson et al. ............... 375/206 |
| 5,945,944 A | 8/1999 | Krasner ................... 342/357.06 |
| 5,956,328 A | 9/1999 | Sato ........................... 370/335 |
| 5,963,582 A | 10/1999 | Stansell, Jr. ................. 375/200 |
| 5,970,084 A | 10/1999 | Honda ........................ 375/200 |
| 5,977,909 A | 11/1999 | Harrison et al. ......... 342/357.09 |
| 5,982,324 A | 11/1999 | Watters et al. .......... 342/357.06 |
| 5,987,016 A | 11/1999 | He .............................. 370/335 |
| 5,991,309 A | 11/1999 | Jensen et al. ................ 370/492 |
| 5,991,613 A | 11/1999 | Euscher et al. ........... 455/277.1 |
| 5,995,537 A | 11/1999 | Kondo ........................ 375/208 |
| 5,999,124 A | 12/1999 | Sheynblat ................ 342/357.09 |
| 6,002,362 A | 12/1999 | Gudat .................... 342/357.03 |
| 6,002,363 A | 12/1999 | Krasner ..................... 342/357.1 |
| 6,002,709 A | 12/1999 | Hendrickson ................ 375/206 |
| 6,009,551 A | 12/1999 | Sheynblat ................... 714/776 |
| 6,016,119 A | 1/2000 | Krasner ................... 342/357.06 |
| 6,023,462 A | 2/2000 | Nieczyporowicz et al. . 370/335 |
| 6,041,222 A | 2/2000 | Horton et al. ............... 455/255 |
| 6,047,016 A | 4/2000 | Ramberg et al. ............. 375/200 |
| 6,047,017 A | 4/2000 | Cahn et al. .................. 375/200 |
| 6,049,715 A | 4/2000 | Willhoff et al. .............. 455/436 |
| 6,052,081 A | 4/2000 | Krasner ................... 342/357.02 |
| 6,061,018 A | 5/2000 | Sheynblat ................ 342/357.06 |
| 6,064,336 A | 5/2000 | Krasner ................... 342/357.05 |
| 6,064,688 A | 5/2000 | Yanagi ........................ 375/149 |
| 6,075,809 A | 6/2000 | Naruse ........................ 375/147 |
| 6,104,338 A | 8/2000 | Krasner ................... 342/357.06 |
| 6,104,340 A | 8/2000 | Krasner ..................... 342/357.1 |
| 6,107,960 A | 8/2000 | Krasner ................... 342/357.09 |
| 6,111,540 A | 8/2000 | Krasner ..................... 342/357.1 |
| 6,131,067 A | 10/2000 | Girerd et al. ................ 701/213 |
| 6,133,871 A | 10/2000 | Krasner ................... 342/357.06 |
| 6,133,873 A | 10/2000 | Krasner ................... 342/357.12 |
| 6,133,874 A | 10/2000 | Krasner ................... 342/357.15 |
| 6,150,980 A | 11/2000 | Krasner ..................... 342/357.1 |

SIGNAL DETECTOR EMPLOYING COHERENT INTEGRATION

CLAIM OF PRIORITY

This application is a continuation of copending U.S. utility application entitled, "SIGNAL DETECTOR EMPLOYING COHERENT INTEGRATION," having Ser. No. 09/281,566, filed Mar. 30, 1999, which is entirely incorporated herein by reference.

RELATED APPLICATIONS

This application is related to U.S. Pat. application Ser. No. 09/145,055, filed Sep. 1, 1998, and entitled "DOPPLER CORRECTED SPREAD SPECTRUM MATCHED FILTER,"now issued as U.S. Pat. No. 6,044,105 and to U.S. Pat. application Ser. No. 09/281,741, filed on Mar. 30, 1999, and now issued as U.S. Pat. No. 6,304,216 and entitled "SIGNAL DETECTOR EMPLOYING CORRELATION ANALYSIS OF NON-UNIFORM AND DISJOINT SAMPLE SEGMENTS,"both of which are owned in common by the assignee hereof, and both of which are hereby fully incorporated by reference herein as though set forth in full.

BACKGROUND

1. Field of the Invention

This invention relates to the field of signal detection using correlation analysis, and more specifically, to correlation analysis in which coherent integration is employed in order to more rapidly achieve a target signal to noise ratio (SNR).

2. Background of the Invention

The Global Positioning System (GPS) is a collection of 24 earth-orbiting satellites. Each of the GPS satellites travels in a precise orbit about 11,000 miles above the earth's surface. A GPS receiver locks onto at least 3 of the satellites, and responsive, thereto, is able to determine its precise location. Each satellite transmits a signal modulated with a unique pseudo-noise (PN) code. Each PN code comprises a sequence of 1023 chips which are repeated every millisecond consistent with a chip rate of 1.023 MHz. Each satellite transmits at the same frequency. For civil applications, the frequency is known as L1 and is 1575.42 MHz. The GPS receiver receives a signal which is a mixture of the transmissions of the satellites that are visible to the receiver.

The receiver detects the transmission of a particular satellite by correlating the received signal with shifted versions of the PN code for that satellite. If the level of correlation is sufficiently high so that there is a peak in the level of correlation achieved for a particular shift and PN code, the receiver detects the transmission of the satellite corresponding to the particular PN code. The receiver then uses the shifted PN code to achieve synchronization with subsequent transmissions from the satellite.

The receiver determines its distance from the satellite by determining the code phase of the transmission from the satellite. The code phase (CP) is the delay, in terms of chips or fractions of chips, that a satellite transmission experiences as it travels the approximately 11,000 mile distance from the satellite to the receiver. The receiver determines the code phase for a particular satellite by correlating shifted versions of the satellite's PN code with the received signal after correction for Doppler shift. The code phase for the satellite is determined to be the shift which maximizes the degree of correlation with the received signal.

The receiver converts the code phase for a satellite to a time delay. It determines the distance to the satellite by multiplying the time delay by the velocity of the transmission from the satellite. The receiver also knows the precise orbits of each of the satellites. Updates to the locations of the satellites are transmitted to the receiver by each of the satellites. This is accomplished by modulating a low frequency (50 Hz) data signal onto the PN code transmission from the satellite. The data signal encodes the positional information for the satellite. The receiver uses this information to define a sphere around the satellite at which the receiver must be located, with the radius of the sphere equal to the distance the receiver has determined from the code phase. The receiver performs this process for at least three satellites. The receiver derives its precise location from the points of intersection between the at least three spheres it has defined.

The Doppler shift (DS) is a frequency shift in the satellite transmission caused by relative movement between the satellite and the receiver along the line-of-sight (LOS). It can be shown that the frequency shift is equal to $v_{LOS}/\lambda$, where $v_{LOS}$ is the velocity of the relative movement between the satellite and receiver along the LOS, and $\lambda$ is the wavelength of the transmission. The Doppler shift is positive if the receiver and satellite are moving towards one another along the LOS, and is negative if the receiver and satellite are moving away from one another along the LOS.

The Doppler shift alters the perceived code phase of a satellite transmission from its actual value. Hence, the GPS receiver must correct the satellite transmissions for Doppler shift before it attempts to determine the code phase for the satellite through correlation analysis.

The situation is illustrated in FIG. 1, which shows a GPS receiver 10 and three GPS satellites 12a, 12b, and 12c. Each satellite 12a, 12b, 12c is transmitting to the GPS receiver 10. Satellite 12a is moving towards the GPS receiver 10 along the LOS at a velocity $v_a^+$ 14; satellite 12b is moving away from the GPS receiver 10 along the LOS at a velocity $v_b^-$ 16; and satellite 12c is moving away from the GPS receiver 10 along the LOS at a velocity $v_c^-$ 18. Consequently, assuming a carrier wavelength of $\lambda$, the transmission from satellite 12a will experience a positive Doppler shift of $v_a^+/\lambda$; the transmission from satellite 12b will experience a negative Doppler shift of $$\frac{v_b^-}{\lambda};$$

and the transmission from satellite 12c will experience a negative Doppler shift of $$\frac{v_c^-}{\lambda}.$$

The GPS receiver functions by sampling the received signal 20 over a defined sampling window and then processing the samples. The duration of the sampling window is chosen to achieve a target signal to noise ratio (SNR). The target SNR is chosen to permit the presence and range of the satellites to be accurately detected. If the duration is too short, the signal may be such that there is no correlation value for a particular set of hypotheses which is significantly larger than the correlation values resulting from the other hypotheses tested. The duration of the sampling window must then be increased in order to increase the signal to noise ratio of the received signal 20, and permit the presence and range of satellites visible to the receiver to be accurately detected.

In addition to the biphase PN modulation of the GPS carrier, there is also a 50 Hz data modulation. This superimposed data modulation carries information about the satellite orbits. In order to navigate, the system must collect this data so that the locations of the satellites can be calculated as a function of time. This is a necessary piece of information for determining the range to the satellite from the PN code phase. At 50 Hz, the data causes unknown phase flips every 20 milliseconds or data epoch.

GPS receivers typically function by achieving synchronization with certain ones of the collection of GPS satellites, and then maintaining synchronization in a continuous tracking mode of operation. However, in certain applications, such as those involving low power consumption or inherently low C/No, as when operating inside of buildings, an intermittent or code tracking only mode of operation is employed in which a reduced tracking loop bandwidth is used to maintain loop SNR. For example, when C/No falls below 26–28 dB-Hz, data collection and carrier tracking are no longer possible, and GPS receivers change to the code track only mode in which is not possible to receive the 50 Hz data streams to derive bit sync.

In applications such as these, prior art receivers typically attempt to detect a signal of interest or a parameter of the signal of interest by multiplying the segment of samples by a hypothesis about the signal of interest, and then non-coherently integrating the resulting product values over the duration of the sampling window. Non-coherent integration is employed because the phase reversals at the data epochs are unknown, and phase inversions on opposite sides of an inversion point subtract. The result is a decrease in the signal voltage with integration time rather than an increase as desired. In a typical implementation, the magnitude of successive ones of the product values are added together, and phase information represented by the successive values is ignored. The result is a correlation value which is a measure of the degree of correlation between the segment of samples and the hypothesis.

The problem is that noise which may be and typically is reflected in the product values has a magnitude, and when the product values are added together, the magnitude of the noise which is present in each of the values accumulates incrementally in the final sum due to the non-coherent integration procedure. In other words, noise from successive intervals does not have a chance to cancel out the noise from previous intervals. Since the noise magnitudes for successive values add together, the cumulative effect of the noise in the final correlation value can be quite substantial.

Due to the cumulative effects of the noise, the duration of the sampling window has to be substantially increased to achieve a target SNR. The result is that the time required for the GPS receiver to achieve synchronization with satellites visible to it is dramatically increased. In addition, the power consumed by the receiver is also dramatically increased. The problem is particularly acute for applications involving integrating a GPS receiver with a mobile wireless handset. The consumption of excessive power by such a device drains battery power, and reduces the call-time available from the handset.

Consequently, there is a need for a signal detector which overcomes the disadvantages of the prior art. Similarly, there is a need for a GPS receiver which overcomes the disadvantages of the prior art.

SUMMARY OF THE INVENTION

Figure 1:
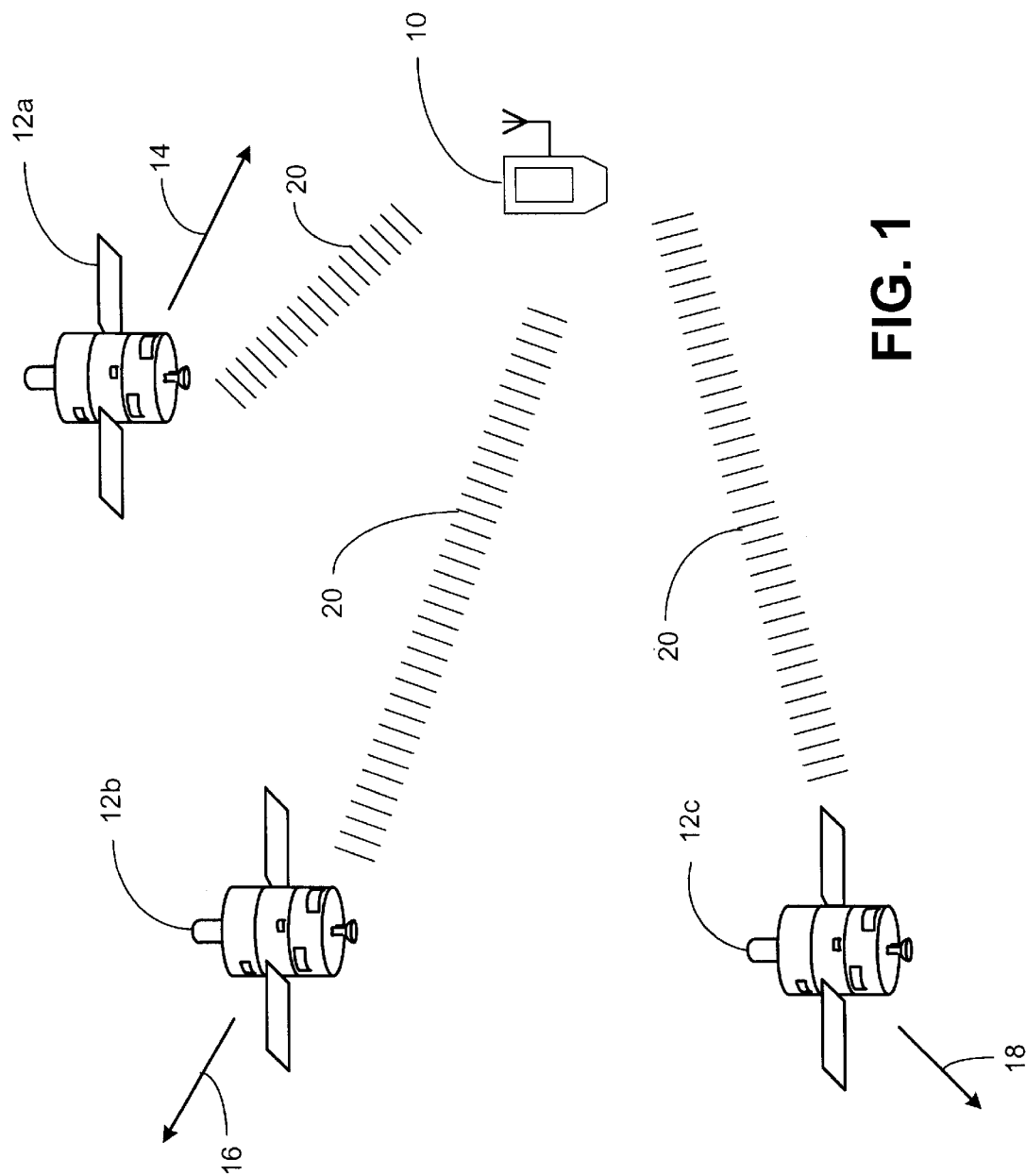
FIG. 1 illustrates an example environment for operation of a GPS receiver.

In accordance with the purpose of the invention as broadly described herein, there is provided a signal detector which employs correlation analysis to test alternative hypotheses regarding a signal of interest, or a parameter of a signal of interest, in a received signal, and which also employs coherent integration to derive the correlation values representative of the degree of correlation between each of the hypotheses and the received signal. The received signal comprises the signal of interest perturbed by noise or pseudo-noise. The precise constitution of the received signal is unknown at the receiver. The receiver tests various hypotheses about the presence of a signal of interest, or a parameter of the signal of interest, in the received signal, through correlation analysis. The hypothesis which yields a peak in the correlation values is selected as the correct hypothesis.

The present invention is particularly applicable to low $C/N_0$ or duty-cycled, low power operation applications of a GPS receiver in which the GPS waveform is not tracked continuously, so that bit synchronization, the location of data epochs, and phase reversals at the data epochs, is not derived from the GPS waveform itself, but rather from another source, such as over a cell phone network, base station or the like, which is capable of providing timing information regarding the GPS system.

In one embodiment, data representative of a hypothesis is multiplied by complex samples of the received signal over a defined duration of time. A complex sample is one which has real and imaginary components, or equivalently, has magnitude and phase components. A complex sum of the samples is determined by coherently adding together the resulting product values over the defined duration such that the phase information which is present in each of the samples, and which is reflected in each of the product values, is maintained. The correlation values which are produced are complex correlation values.

In a second embodiment, a signal of interest is divided up into frames, and may be subject to phase reversals at the boundaries between frames. A segment of samples of the received signal may cross a frame boundary of the signal of interest. In this second embodiment, a detector detects the phase reversals, and, in response thereto, flips the sign of the samples in the ensuing frame. That allows the coherent integration to cross frame boundaries.

In a third embodiment, in which the signal of interest is again divided up into frames, and may be subject to phase reversals at the boundaries between frames, a detector detects the frame boundaries, but does not detect whether a phase reversal has occurred at the boundary. In this embodiment, coherent integration is carried out up to the frame boundary, and the result put aside in a temporary storage location for the hypothesis being tested. Coherent integration is then carried out beginning on the other side of the frame boundary. When this is completed, the value stored in the temporary storage location is retrieved and non-coherently combined with the current value.

In a fourth embodiment, in which the signal of interest is again divided up into frames, and subject to phase reversals at the frame boundaries, a detector detects the frame boundaries, but not necessarily the phase reversals. According to this embodiment, coherent integration is carried out up to the frame boundary, and from that period forward, the coherent integration is continued in parallel under alternate hypotheses about the phase of the signal of interest at the frame boundary. According to one alternate hypothesis, the phase is assumed to remain the same. According to a second alternate hypothesis, the phase is assumed to have flipped at the frame boundary. When the integration is complete, the phase hypothesis which yields the largest value of the integration is assumed to be the correct one.

In one application, the signal detector of the invention is part of a GPS receiver. In this embodiment, the GPS receiver comprises a radio frequency (RF) receiver, sampling circuitry, timing circuitry, a PN code generator, a matched filter, and a GPS processor. The RF receiver demodulates the received signal to obtain a baseband signal. The sampling circuitry provides, responsive to timing signals produced by the timing circuitry, a segment of samples of the baseband signal taken over a defined sampling window. The matched filter processes the segment of samples in accordance with a plurality of PN code, Doppler shift, and code phase hypotheses.

In one implementation, the signal of interest is a repeating PN code modulated by a lower frequency binary data signal. The period of the data signal defines a frame. If the data value switches state at the frame boundary, the signal of interest is subject to a phase reversal.

In this implementation, the matched filter operates at a time on a segment of samples in which the segment may cross frame boundaries. In one implementation example, the duration of a segment is that of a frame. That way, each segment will cross at most one frame boundary.

In this implementation, the matched filter outputs correlation data derived by correlating various combinations of PN code, Doppler shift and code phase hypotheses with the segment of samples. According to this implementation, the correlation data can be grouped into groupings which correspond to various combinations of specific hypotheses and ranges of hypotheses. In one implementation example, the correlation data comprises a plurality of arrays, wherein each array corresponds to a PN code hypothesis, each row of an array corresponds to a Doppler shift hypothesis, each column of an array corresponds to a code phase hypothesis, and each entry in the array is a measure of the degree to which the combined PN code, Doppler shift, and code phase hypothesis corresponding to the entry correlates to the samples in the segment.

The PN code generator generates the PN code hypotheses which are provided as inputs to the matched filter. In one embodiment, the Doppler shift hypotheses are generated internally within the matched filter. The GPS processor sends out data capture commands to the sampling circuitry and the matched filter directs the sampling circuitry to capture a segment of samples, and directs the matched filter to process the segment of samples.

In one embodiment, the samples are complex samples, and each segment of samples is divided into incremental portions or subsegments, and processed one subsegment at a time. In one implementation, the duration of a subsegment is selected such that an integral number of subsegments fits within a frame. In one implementation example, the correlation data resulting from processing a given subsegment of complex samples comprises a plurality of complex arrays, wherein each array in the plurality corresponds to a particular PN code hypothesis, and each row of an array corresponds to a particular Doppler shift hypothesis. Cumulative correlation arrays are maintained and initialized with the correlation arrays for the first subsegment. Then, the correlation arrays for the second subsegment are combined through complex addition with the cumulative correlation arrays one array element at a time. The process continues for each of the subsegments in the segment of samples.

In one implementation, a detection circuit detects frame boundaries and phase reversals imposed by the data signal at the frame boundaries. If the detection circuit indicates a phase reversal at a frame boundary, the phase of the ensuing samples is reversed. In one implementation example, this is accomplished by flipping the sign of the complex phasor generated by a Doppler generator circuit to correct for Doppler shift. A complex mixer multiplies the complex samples of the received signal by the complex phasor. By flipping the sign of the complex phasor, the sign of the ensuing samples is effectively reversed. Coherent integration may thus proceed across the frame boundary.

In a second implementation, a detector circuit detects the frame boundary, but not necessarily the phase reversal at the frame boundary. In this implementation, coherent integration is carried out up to the frame boundary, and the result stored in temporary storage. The cumulative data is then reset, and coherent integration resumed on the other side of the frame boundary. When this has been completed, the results in temporary storage represent coherent integration over a first portion of the segment, and the current cumulative values represent coherent integration over a second remaining portion of the segment.

According to the second implementation, these results are non-coherently combined. In one implementation example, a procedure is employed in which the magnitude of each complex correlation value is determined by taking the square root of the sum of the squares of the real and imaginary part of each value. This procedure is employed for each correlation value in temporary storage representative of the first portion of the segment, and each correlation value representative of the second portion of the segment. The magnitude values are then combined by simply adding corresponding values together for the first and second portions.

In a third implementation, a detection circuit again detects frame boundaries, but not necessarily the phase reversals at the frame boundaries. Again, coherent integration is carried out up to a frame boundary. Then, the results are replicated for a plurality of alternative hypotheses about the phase reversal. In one implementation example, the results are replicated once, such that a total of two integrations are carried out in parallel, each corresponding to an alternative hypothesis regarding phase reversal. According to this implementation example, one hypothesis is that phase is unchanged across the frame boundary, and the other is that the phase has flipped across the frame boundary. Coherent integration then proceeds across the frame boundary, with multiple integrations being conducted in parallel consistent with the alternative phase hypotheses. At the conclusion of this process, a determination is made of which phase hypothesis yields the greatest correlation values. The phase hypothesis which does so is then selected as the correct hypothesis, and the correlation values corresponding to this phase hypothesis are selected as the correct ones for the other hypotheses involved.

By coherently integrating the product data for a given hypothesis, the subject invention is able to achieve a target SNR in the resulting correlation data in a shorter amount of time. The reason is that successive samples of noise perturbing successive signal samples tends to cancel itself out when the phase information thereof is taken account of through coherent integration. The result is that a signal detector or GPS receiver in accordance with the subject invention is faster and consumes less power than prior art detectors and receivers.

Related methods of operation and computer readable media are also provided.

DETAILED DESCRIPTION OF THE PREFERRED EMBODIMENTS

I. First Embodiment of a Signal Detector

Figure 2:
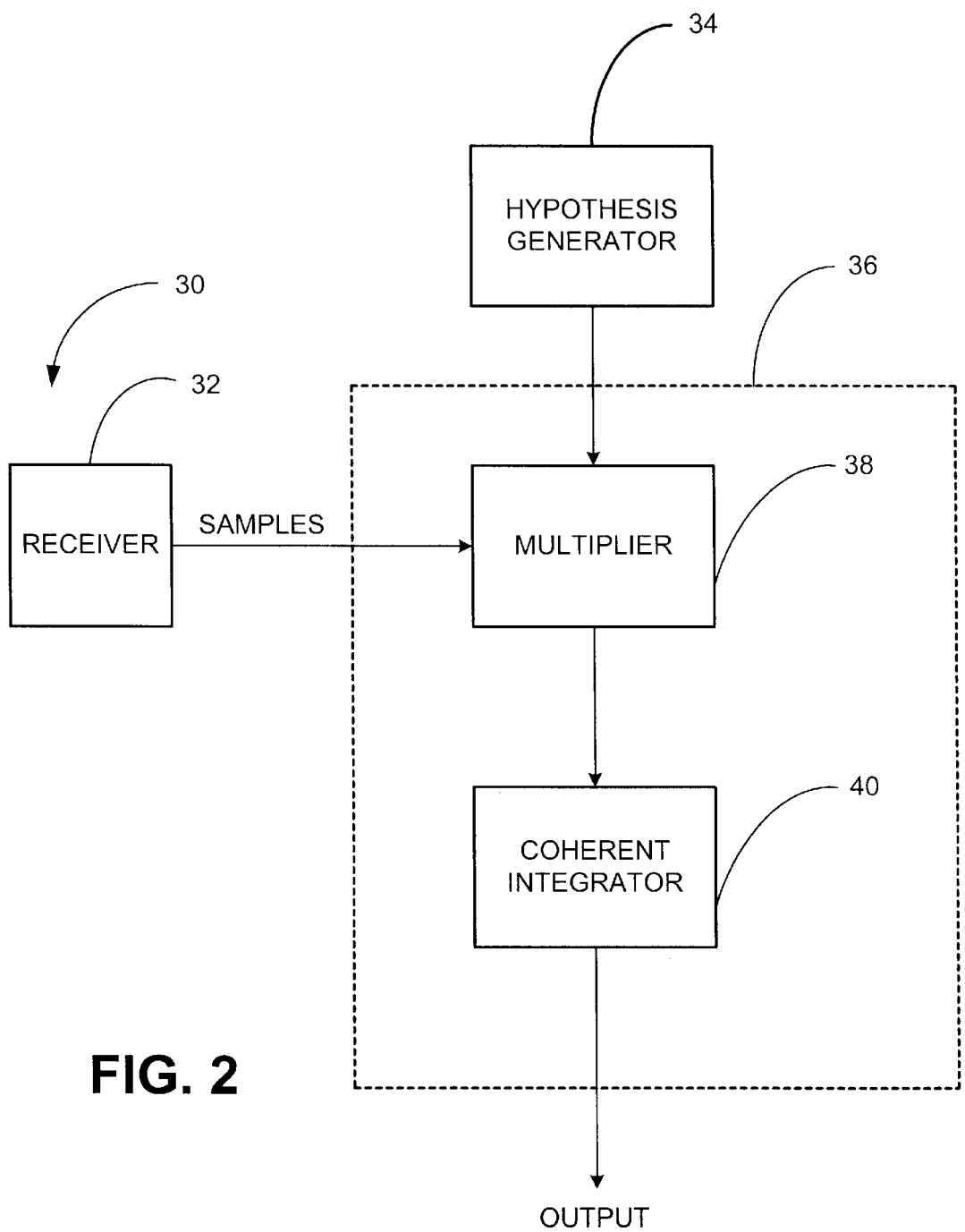
FIG. 2 illustrates an embodiment of a signal detector in accordance with the subject invention.

A block diagram of one embodiment of a signal detector in accordance with the subject invention is illustrated in FIG. 2. As illustrated, the signal detector 30 comprises a receiver 32 configured to receive a signal, and provides samples thereof. The signal may comprise a signal of interest perturbed by noise. Alternatively, in accordance with a spread spectrum environment, the signal may comprise the combination of multiple signals of interest each encoded or modulated using one of a plurality of pseudo-noise (PN) codes. In this case, other signals appear as noise to a particular signal of interest. The samples of the signal each have real and imaginary components, or equivalently, magnitude and phase components. In one implementation, each sample of the signal has in-phase (I) and quadrature (Q) components which can be represented as a complex number of the following form: I+jQ.

A hypothesis generator 34 generates a plurality of hypotheses about the signal of interest. A correlator 36 is provided which comprises a multiplier 38 and a coherent integrator 40. The multiplier 38 receives the plurality of hypotheses from hypothesis generator 34, and samples of the signal received by receiver 32, and responsive thereto, generates product data representative of the product of the samples of the received signal and data representative of each of the plurality of generated hypotheses.

The product data is provided to coherent integrator 40, which coherently integrates the product data for a given hypothesis over a defined duration, that is to say, the coherent integrator 40 takes account of the phase information for the samples from receiver 32 which are reflected in the product data for a given hypothesis. Each of the product values have real and imaginary components, or equivalently, magnitude and phase components, and coherent integration is achieved by separately integrating the real and imaginary, or equivalently the magnitude and phase components, of the product values. The result is a correlation value, having real and imaginary components, or equivalently, magnitude and phase components, for the given hypothesis which measures the degree of correlation between the given hypothesis and the received signal.

The foregoing procedure is repeated for each of the hypotheses of interest generated by hypothesis generator 34. The result is that a plurality of correlation values are output by the coherent integrator 40, each corresponding to a given hypothesis, and each having real and imaginary, or equivalently, magnitude and phase components.

These correlation values are then analyzed, and, responsive thereto, one of the tested hypotheses is selected as the correct one. In one implementation, this is accomplished through peak detection, according to which a correlation value is selected which has a significantly larger magnitude than that of the other correlation values. The hypothesis corresponding to this correlation value is then selected as the correct hypothesis.

Figure 3:
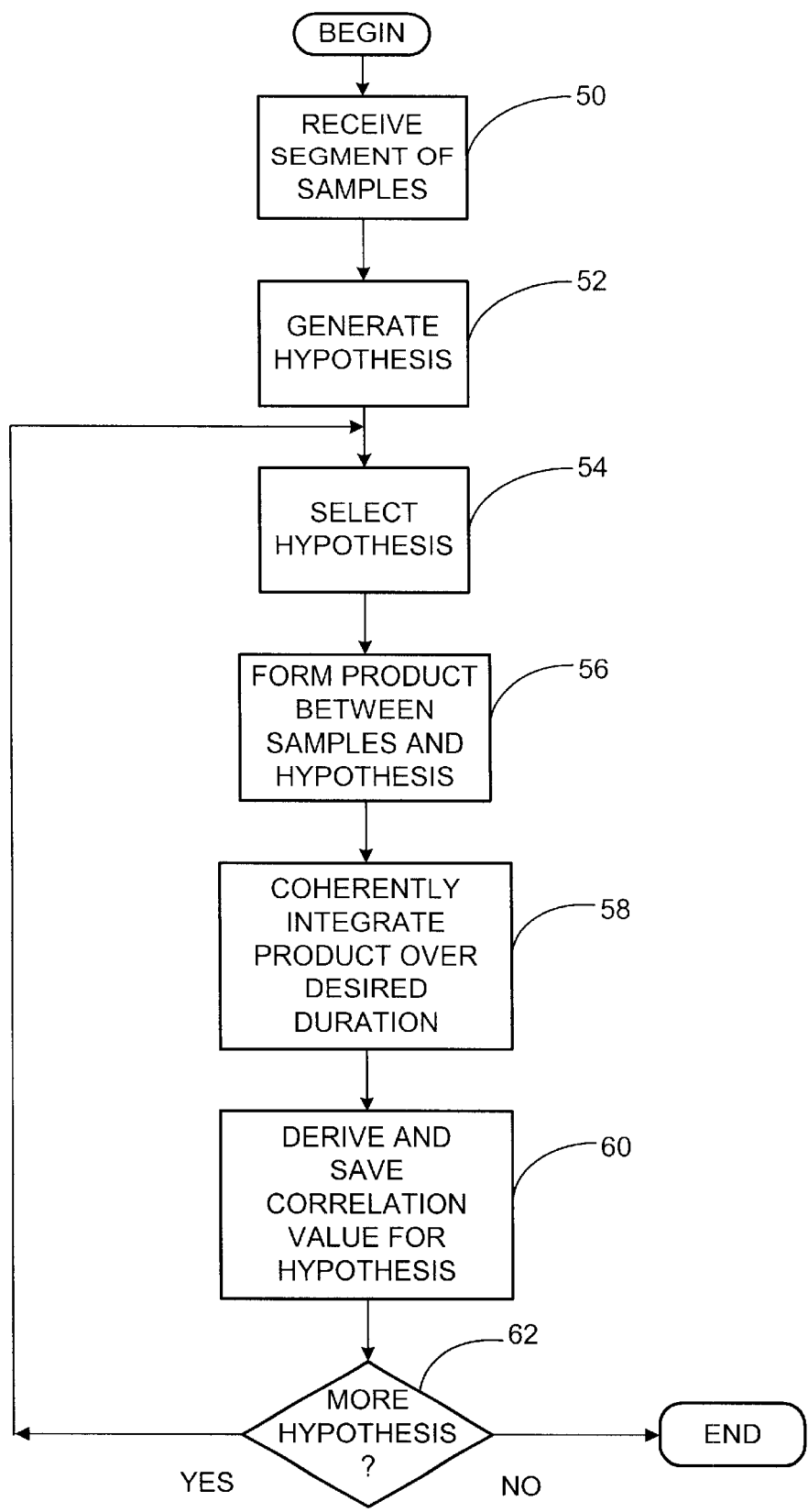
FIG. 3 illustrates an embodiment of a method of operation of a signal detector in accordance with the subject invention.

A flowchart of a method of operation of a signal detector in accordance with the foregoing embodiment of the subject invention is illustrated in FIG. 3. As illustrated, the process begins at step 50, in which a segment of samples of a signal is received. Typically, the signal comprises a signal of interest perturbed by noise or pseudo-noise.

Then, in step 52, a plurality of hypotheses are generated for testing. In step 54, one of the hypotheses from step 52 is selected, and in step 56, the product is formed between the samples of the signal and data representative of the hypothesis selected in step 54.

In step 58, the product data resulting from step 56 is coherently integrated over a defined duration, and in step 60, a correlation value is derived from the coherent integration performed in step 58, and saved for the hypothesis. In step 62, a determination is made whether there are any additional hypotheses of the plurality generated in step 52 that remain to be tested. If so, a jump is made to step 54, and the process beginning at this point repeats itself for one of the remaining hypotheses. If not, the process terminates.

II. Second Embodiment of a Signal Detector

Figure 4:
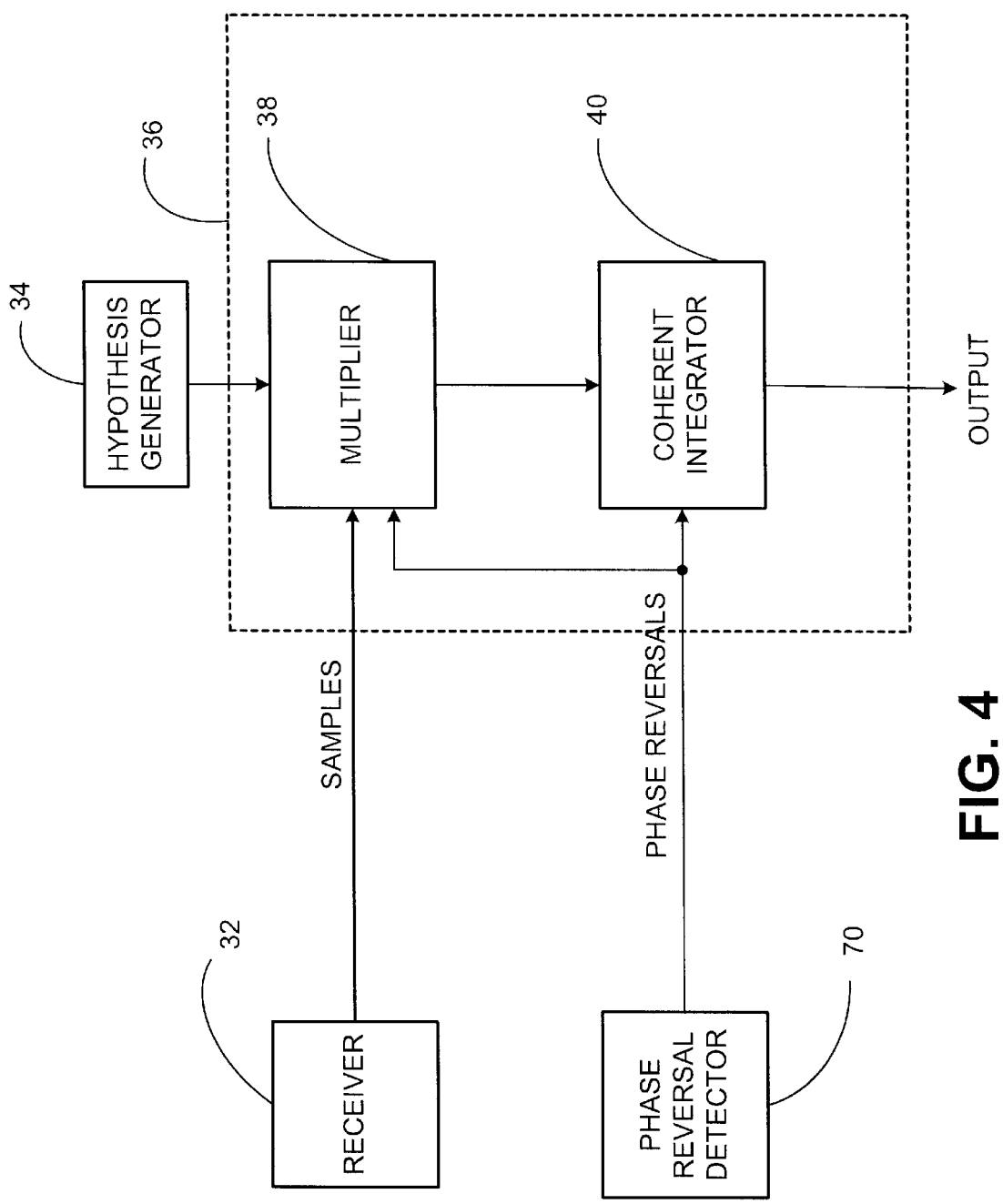
FIG. 4 illustrates a second embodiment of a signal detector in accordance with the subject invention.

A second embodiment of a signal detector in accordance with the subject invention is illustrated in FIG. 4, in which, compared to FIG. 2, like elements are referenced with like identifying numerals.

In this embodiment, the receiver 32 receives a signal, which typically is a signal of interest perturbed by noise or pseudo-noise. The signal of interest is subject to phase reversals which occur at defined frame boundaries. In one implementation, these phase reversals occur due to a low frequency data signal which is modulated onto a higher frequency signal comprising a repeating PN code modulated onto a carrier signal. The receiver 32 samples the signal and provides the samples to multiplier 38 which, together with coherent integrator 40, comprises correlator 36.

As before, hypothesis generator 34 generates a plurality of hypotheses to be tested, and provides the same to multiplier 38. Multiplier 38, responsive to the hypotheses generated by hypothesis generator 34 and the samples from receiver 32, forms the product between the samples and each of the hypotheses and provides the resulting product data to coherent integrator 40.

Phase reversal detector 70 is also provided. In one implementation, it is external to the signal detector. In another, it is internal to the signal detector. In the implementation in which the phase reversal detector is internal to the signal detector, it receives timing and other information from receiver 32 regarding the received signal, and, responsive thereto, detects instances where the signal of interest undergoes a phase reversal at a frame boundary. This information is provided to coherent integrator 40, which uses this information to coherently integrate the product values provided by multiplier 38.

In applications in which the phase reversal detector is external to the signal detector, the phase reversal detector detects phase reversals from a source of information other than the waveform from which the samples are derived. In one example, the phase reversal detector is part of a cellular or PCS phone, and detects phase reversals based on timing information provided to it from the base station servicing the phone in the cellular network.

Coherent integrator 40 receives the product values from multiplier 38, and the phase reversal information from phase reversal detector 70, and, responsive thereto, coherently integrates the product values for a given hypothesis while adjusting for phase reversals that may occur at frame boundaries. The phase reversals must be accounted for to ensure that successive product values subject to the phase reversal add constructively, rather than destructively, to the partial correlation value accumulated from the product values not subject to the phase reversal. In one implementation, this is accomplished by flipping the sign of the samples input to multiplier 38 upon the detection of a phase reversal by phase reversal detector 70.

Coherent integrator 40 then provides correlation values for each of the hypotheses generated by hypothesis generator 34, in which each of the correlation values are determined by taking account of the phase reversals detected by phase reversal detector 70.

Figure 5:
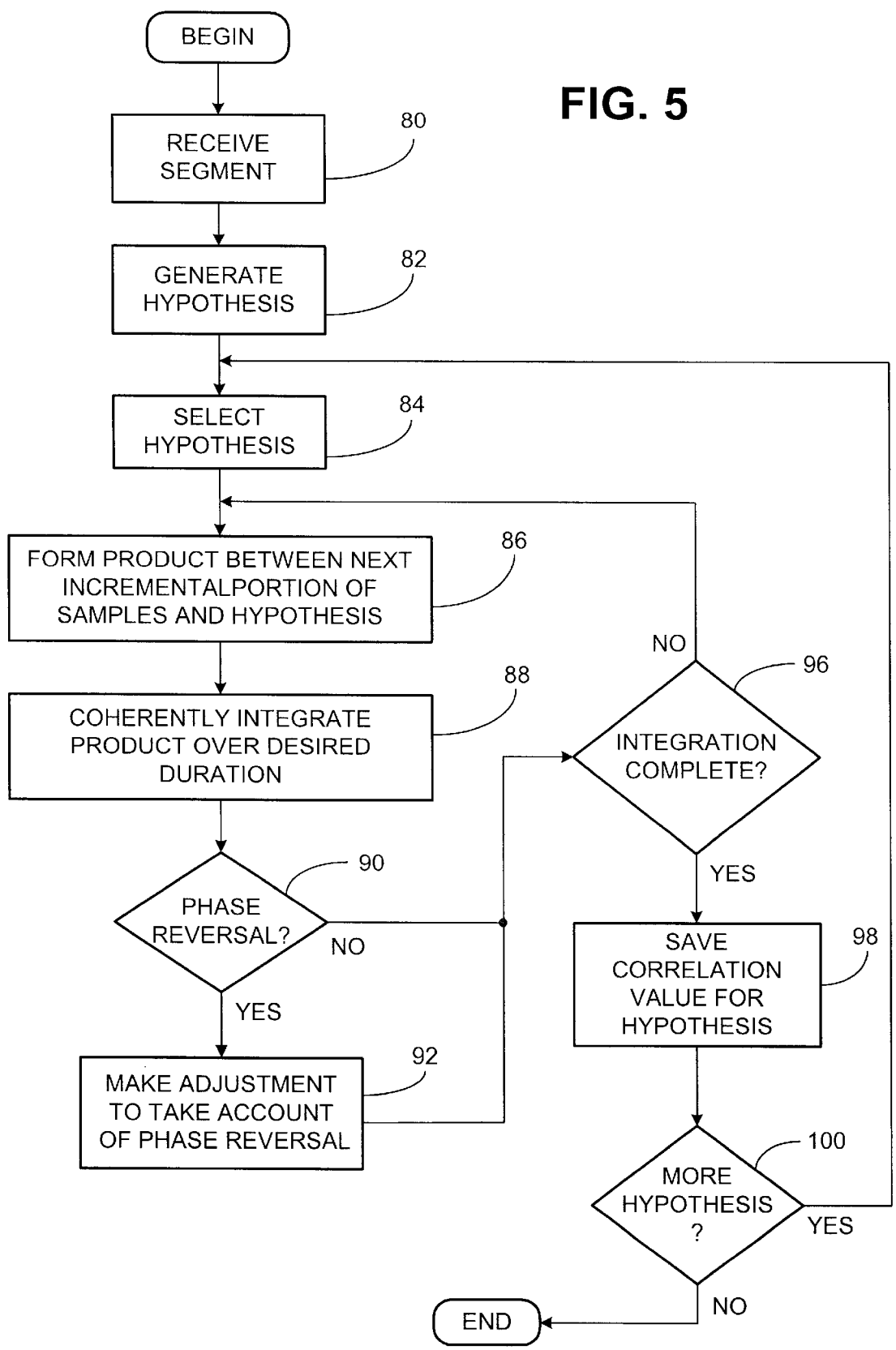
FIG. 5 illustrates a second embodiment of a method of operation of a signal detector in accordance with the subject invention.

A method of operation of a signal detector in accordance with the foregoing embodiment is illustrated in FIG. 5. As illustrated, the process begins at step 80, in which a segment of samples of a signal is received. Typically, the signal comprises a signal of interest perturbed by noise or pseudo-noise. In addition, the signal of interest is subject to phase reversals at defined frame boundaries.

In step 82, a plurality of hypotheses are generated regarding the signal of interest, or a parameter of the signal of interest. In step 84, one of the hypotheses from step 82 is selected for testing. The received samples are then divided up into incremental portions or subsegments.

In step 86, the product between the next incremental portion of the samples and data representative of the hypothesis selected in step 84 is formed. In step 88, coherent integration is performed over the product values resulting from step 86. In step 90, a determination is made whether the ensuing incremental portion of samples is at a frame boundary, and whether there is a phase reversal at the frame boundary. If both conditions are present, step 92 is performed. If not, the process proceeds directly to step 96, bypassing step 92.

In step 92, an adjustment is made to take account of the phase reversal to ensure that subsequent product values add constructively, rather than destructively, to the accumulated integration value. In one embodiment, this step comprises flipping the sign of the ensuing samples until the next phase reversal is detected. The process then proceeds to step 96.

In step 96, a determination is made whether the integration is complete for the selected hypothesis, that is, whether there are any remaining incremental portions of the received samples that remain to be processed for the selected hypothesis. If the integration is not complete, the process jumps to step 86, and the process repeats itself beginning at this point. If the integration is complete for the hypothesis, step 98 is performed. In step 98, a correlation value for the hypothesis is derived from the integration, and stored. Step 100 is then performed. In step 100, a determination is made whether there are more hypotheses to be tested. If so, a jump is made to step 84, and the process beginning at this point is repeated for the next hypothesis to be tested. If not, the process ends.

III. Third Embodiment of a Signal Detector

Figure 6:
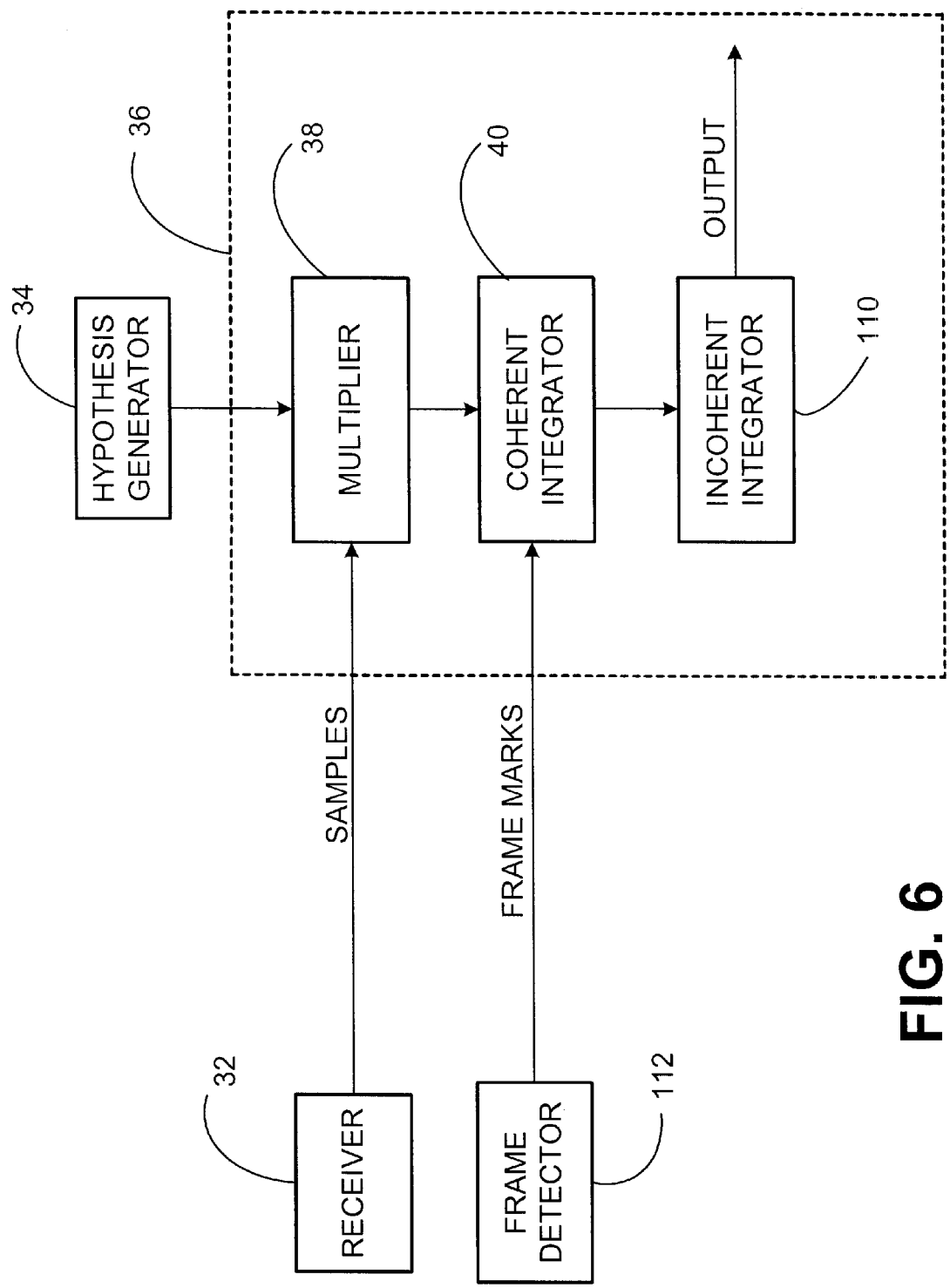
FIG. 6 illustrates a third embodiment of a signal detector in accordance with the subject invention.

A third embodiment of a signal detector in accordance with the subject invention is illustrated in FIG. 6 in which, compared to FIGS. 2 and 4, like elements are referenced with like identifying numerals. In this embodiment, receiver 32 receives a signal which, as in the FIG. 4 embodiment, comprises a signal of interest perturbed by noise or pseudo-noise, and is subject to phase reversals at defined frame boundaries. The receiver 32 provides multiplier 38 with samples of the signal.

Hypothesis generator 34 generates a plurality of hypotheses for testing. Correlator 36 comprises multiplier 38, coherent integrator 40, and noncoherent integrator 110. Multiplier 38, responsive to the hypotheses from hypothesis generator 34 and the samples from receiver 32, produces data representative of the product of the samples and data representative of each of the hypotheses to be tested.

A frame detector 112 is also provided, either internally, as part of the signal detector, or externally, such as from a cellular or PCS phone. In an implementation in which the frame detector is internal to the signal detector, the frame detector receives timing information from the receiver 32, and, responsive thereto, detects the boundaries between frames, and provides a signal to coherent integrator 40 containing this information. In an implementation in which the frame detector is external to the signal detector, the frame detector receives timing information from a source other than the waveform from which the samples are derived. In one implementation example, this timing information is obtained from a cellular, wireless or PCS network.

Coherent integrator 40 receives the product values from multiplier 38, and the information about frame boundaries from frame detector 112, and, responsive thereto, coherently integrates the product values for a given hypothesis up to a frame boundary. When a frame boundary is detected, the partial integration value is stored in a temporary location for the hypothesis, and then the partial integration value reset for the hypothesis. Coherent integration is then resumed for the samples on the other side of the frame boundary. If another frame boundary is detected, the foregoing is repeated. This procedure is repeated for each of the hypotheses to be tested.

At this point, there are a plurality of integration values stored for each hypothesis, with each of the integration values representing the coherent integration of product values between, but not crossing, frame boundaries. This information is then provided to noncoherent integrator 110. Noncoherent integrator 110 receives this information, and, responsive thereto, noncoherently combines the coherent integration values for a given hypothesis. In one implementation, each of the integration values has a real and an imaginary component, and the magnitude of the integration value is obtained by taking the square root of the sum of the squares of the real and imaginary components. The magnitude values for a given hypothesis are then added together to arrive at a correlation value for the hypothesis. The foregoing procedure is then repeated for each of the hypotheses.

Figure 7:
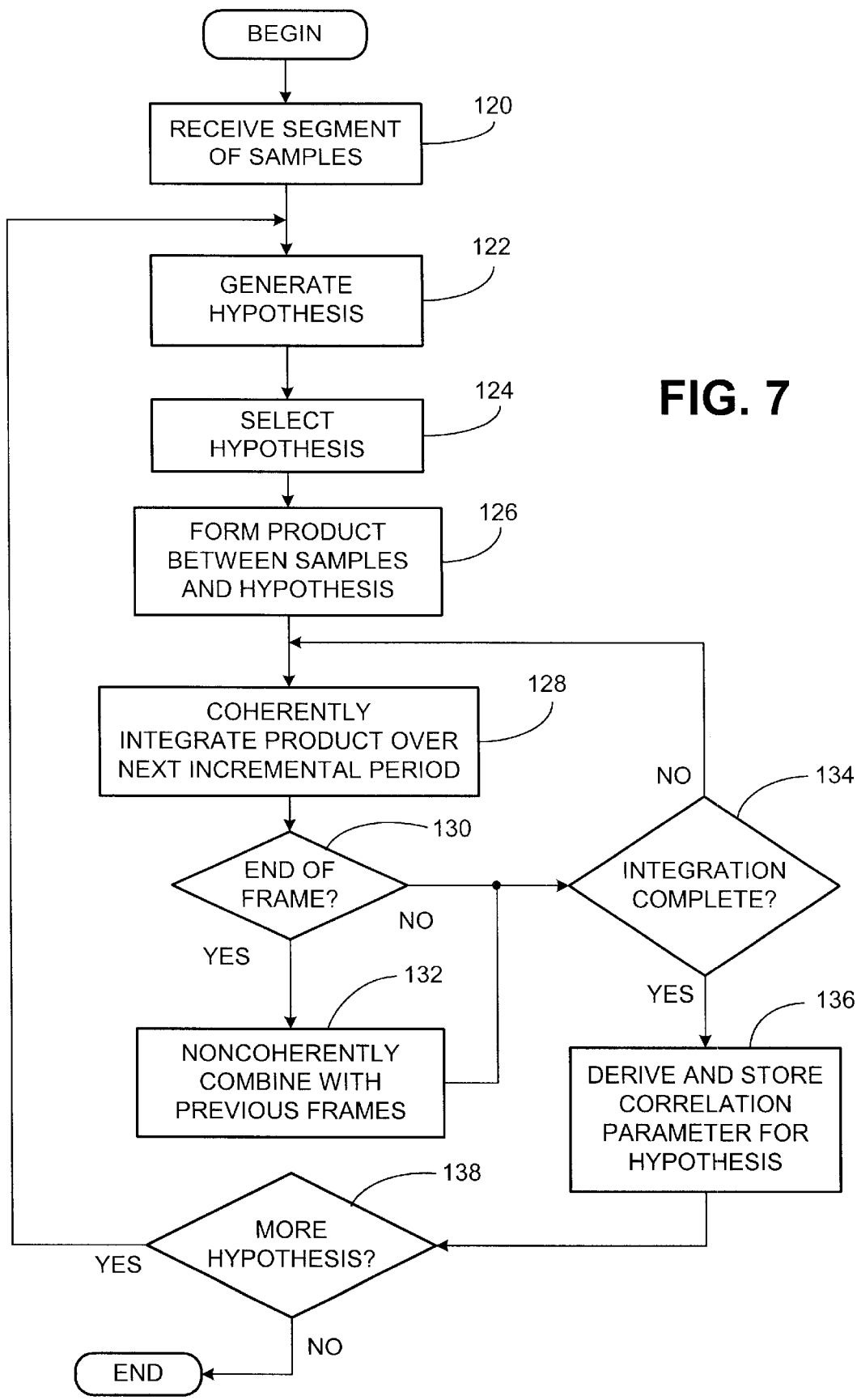
FIG. 7 illustrates a third embodiment of a method of operation of a signal detector in accordance with the subject invention.

A method of operation of a signal detector in accordance with this third embodiment is illustrated in FIG. 7. In step 120, a segment of samples of the signal is received. In step 122, a plurality of hypotheses regarding the signal of interest are generated. In step 124, one of the hypotheses is selected. In step 126, the product between the samples and data representative of the hypothesis is formed. The resulting product values are then divided up into a plurality of incremental portions or subsegments.

In step 128, the next incremental portion of product values for the selected hypothesis are coherently integrated. In step 130, a determination is made whether a frame boundary has been detected. If so, step 132 is performed. If not, step 132 is bypassed, and step 134 performed directly.

In step 132, the current integration value for the hypothesis is noncoherently combined with any previous integration values obtained for previous frames. In one implementation, the magnitude of the current integration value is obtained by taking the square root of the sum of the squares of the real and imaginary components thereof, or equivalently, the sum of the squares of the real and imaginary components. This value is then added to the magnitudes which have been derived for the hypothesis for previous frames.

In step 134, a determination is made whether the integration has been completed for the current hypothesis. If not, a jump is made to step 128, and the process repeated at this point for the next incremental portion of product values. If so, a jump is made to step 136 to derive and store the correlation parameter for the hypothesis. Then, at step 138, a determination is made whether more hypothesis are required. If so, the process jumps to step 124. If not, the process ends.

At the conclusion of the process, a plurality of correlation values are available, with a correlation value corresponding to each of the hypotheses tested.

IV. Application of a Signal Detector in a GPS Receiver

It is contemplated that the foregoing signal detector can be beneficially employed in a variety of applications, such as in a GPS receiver. The present invention is particularly applicable to low C/N₀ or duty-cycled, low power operation applications of a GPS receiver in which the GPS waveform is not tracked continuously, but only intermittently. In applications such as this, information about bit synchronization, the location of data epochs, and phase reversals at the data epochs is not directly available from the GPS waveform itself, but must be derived from another source, such as a cell or PCS phone network or base station, or a local clock periodically synchronized with the atomic clocks maintained on the GPS satellites.

Figure 8:
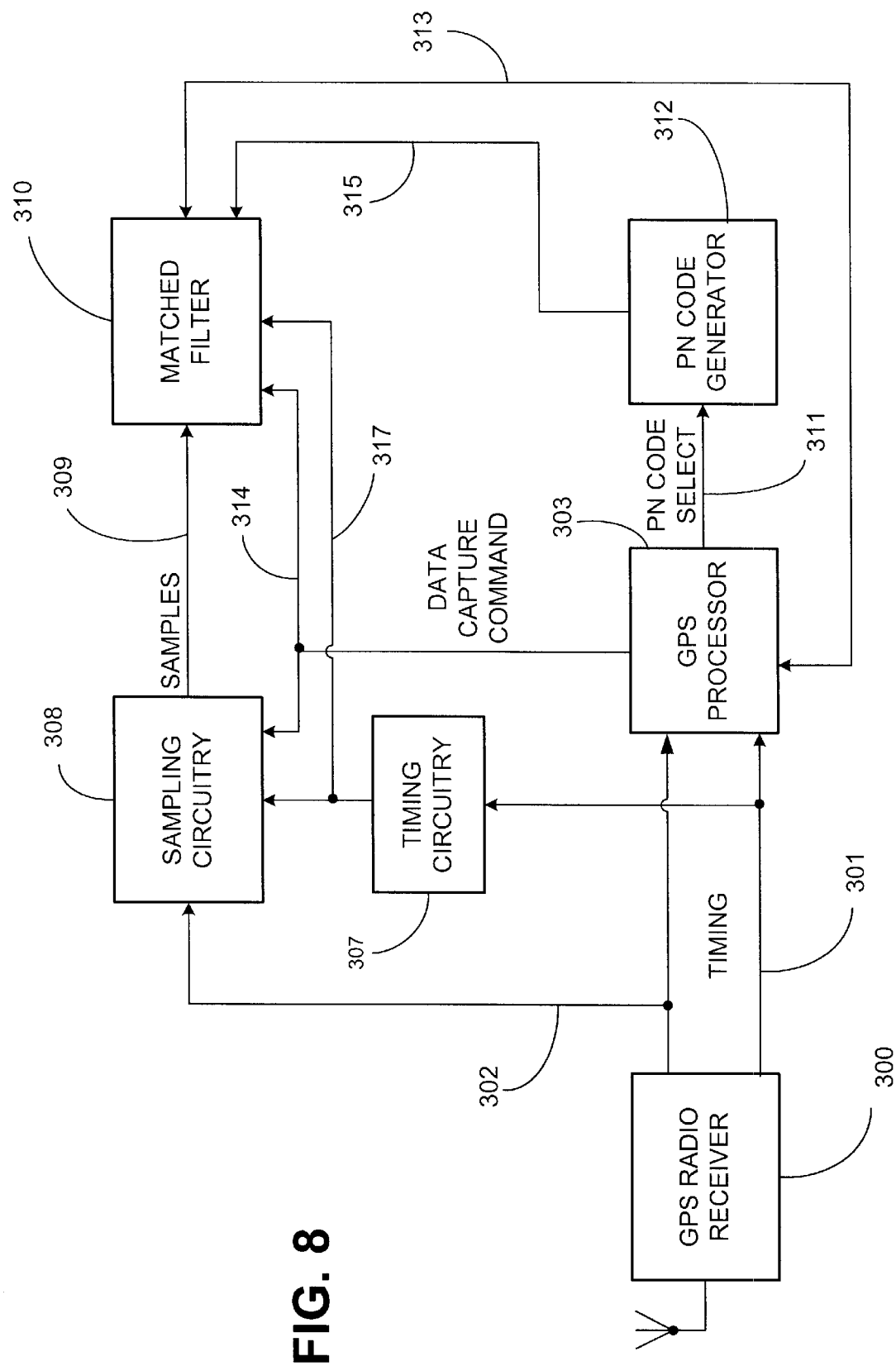
FIG. 8 illustrates an embodiment of a GPS receiver in accordance with the subject invention.

One embodiment of a GPS receiver in accordance with the subject invention is illustrated in FIG. 8. As shown, the receiver comprises a radio frequency (RF) GPS radio receiver 300, sampling circuitry 308, timing circuitry 307, a PN code generator 312, a matched filter 310, and a GPS processor 303. In one embodiment, a signal is received by GPS radio receiver 300 which comprises a plurality of signals, each from a satellite visible to the receiver. Each satellite signal comprises a repeating PN code unique to the satellite. Each period of the PN code comprises 1023 chips which repeats every 1 mS, for a nominal chip rate of 1.023 MHz. Each satellite signal is modulated with a 50 Hz data signal. The period of the data signal, 20 mS, defines a frame.

One purpose of the data signal is to convey locational information about the satellite to the receiver.

The data signal is capable of changing state every 20 mS period, that is, at a frame boundary. If the data signal changes state, the underlying signal undergoes a phase reversal. If the data signal remains the same, the phase of the underlying signal remains the same.

The GPS radio receiver 300 demodulates the received signal to obtain a baseband signal which is provided to the sampling circuitry 308 over signal line 302. The sampling circuitry 308 provides, responsive to timing signals produced by the timing circuitry 307, a segment of samples of the baseband signal taken over a defined sampling window. The segment of samples is provided to the matched filter 310 over signal line 309. The matched filter 310 processes the segment of samples in accordance with a plurality of PN code, Doppler shift, and code phase hypotheses.

Figure 9:
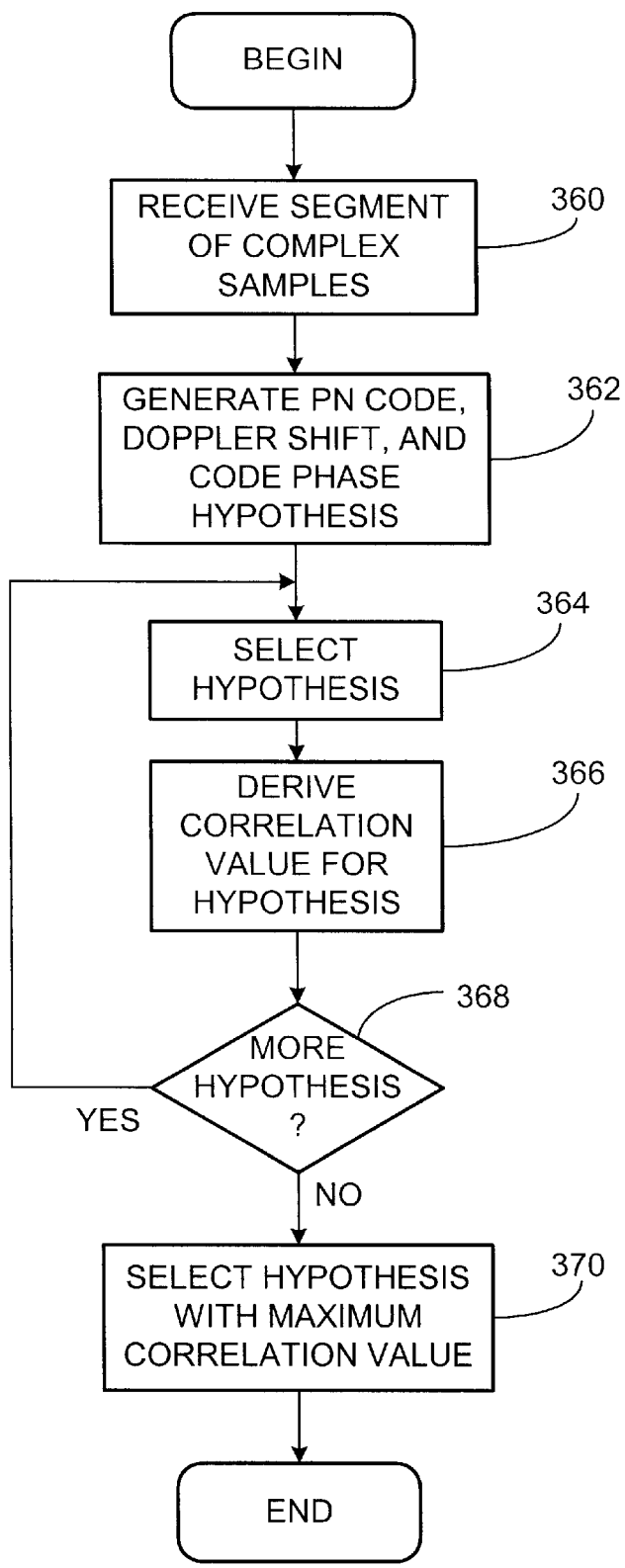
FIG. 9 illustrates an embodiment of a method of operation of a GPS receiver in accordance with the subject invention.
Figure 11:
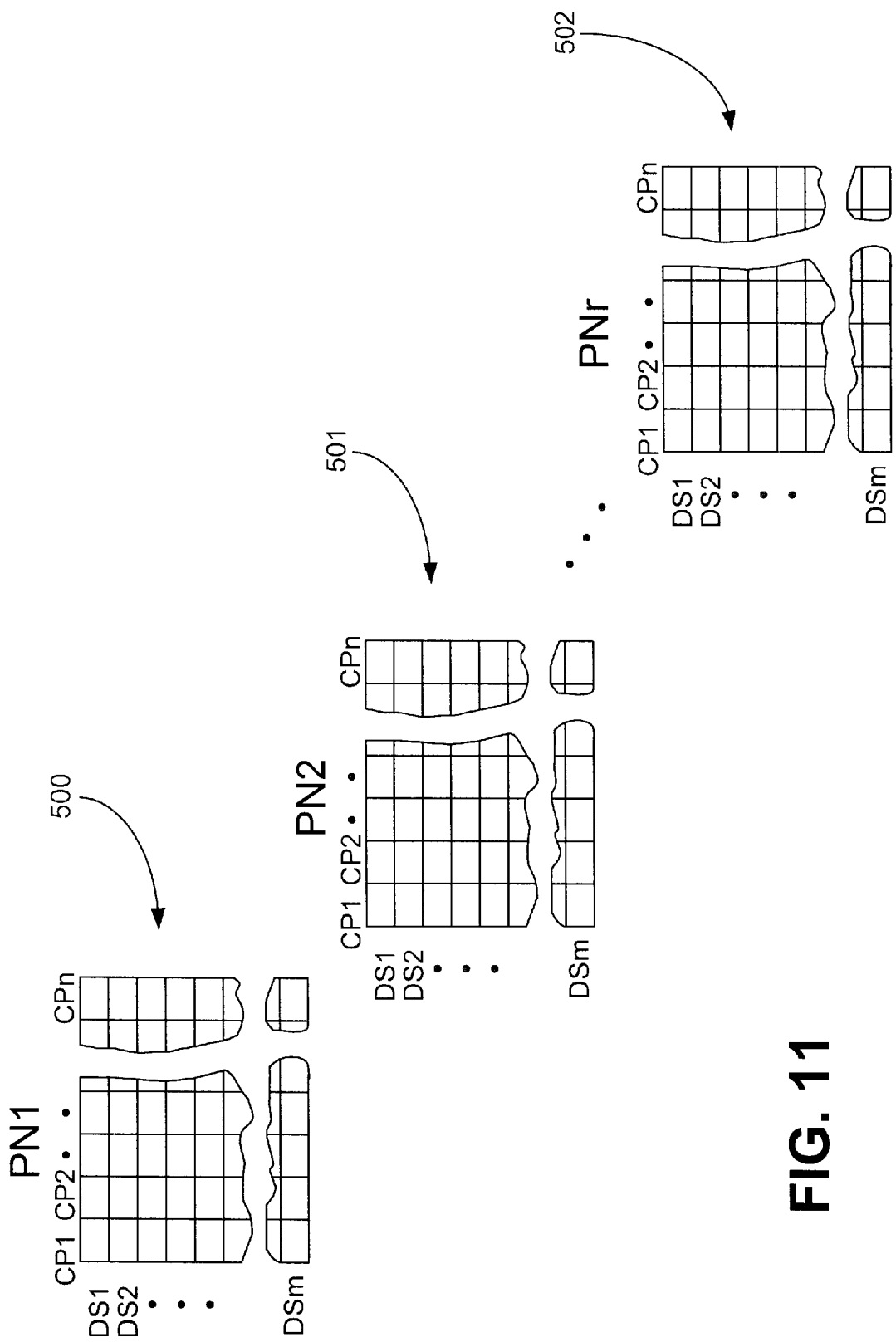
FIG. 11 illustrates the data structures output by one embodiment of a matched filter in accordance with the subject invention.

FIG. 9 illustrates a method of operation for the selection of a hypothesis with maximum correlation value when a plurality of PN code, Doppler shift, and code phase hypothesis are employed. In step 360, a segment of complex samples is received. Then in step 362 the PN code, Doppler shift, and code phase hypothesis are generated. At step 364 the hypothesis is selected for testing and at step 366 a correlation value for the hypothesis is derived. At step 368 a determination is made whether more hypothesis is required. If so, a jump is made to step 364 and the process continues as described above. If not, step 370 is performed in which the hypothesis with maximum correlation value is selected. In one implementation, as illustrated in FIG. 11, for each segment of samples, the matched filter outputs a plurality of correlation arrays 500, 501, 502 of data derived from the segment of samples. According to this implementation, each array 500, 501, 502 corresponds to a PN code hypothesis, PN1, PN2, . . . PNr, each row of an array 500, 501, 502 corresponds to a Doppler shift hypothesis, DS1, DS2, . . . DSm, each column of an array 500, 501, 502 corresponds to a code phase hypothesis, CP1, CP2, . . . CPn, and each entry in an array 500, 501, 502 is a measure of the degree to which the combined PN code, Doppler shift, and code phase hypothesis corresponding to the entry correlates to the samples. Thus, in FIG. 11, correlation array 500 corresponds to PN code hypothesis PN1; correlation array 501 corresponds to PN code hypothesis PN2; and correlation array 502 corresponds to PN code hypothesis PNr.

Returning now to FIG. 8, the PN code generator 312 generates the PN code hypotheses which are provided as inputs to the matched filter 310 over signal line 315. In one embodiment, the Doppler shift hypotheses are generated internally within the matched filter. The GPS processor 303 issues data capture commands on signal line 314 to the sampling circuitry 308 and the matched filter 310. Each data capture command directs the sampling circuitry 308 to capture a segment of samples, and also directs the matched filter 310 to process the segment of samples. The timing circuitry 307 generates, responsive to first timing signals provided by GPS radio receiver 300, second timing signals which are provided as inputs to the sampling circuitry 308 and the matched filter 310. In one implementation, the first timing signals generated by the GPS radio receiver 300 are generated by a local oscillator within the RF receiver, and define a local time base which is related to the time base maintained by the GPS satellites (FIG. 1).

In one embodiment, the correlation arrays for a segment are grouped by PN code hypothesis, and by Doppler shift hypothesis for a given PN code hypothesis. The result is that each grouping corresponds to a particular combination of PN code hypothesis and Doppler shift hypothesis. In one implementation example, the correlation arrays corresponding to a satellite are used to detect the presence and range of the satellite. Typically, this occurs when the correlation data for a particular set of hypotheses is significantly greater than the correlation data for alternative hypotheses.

V. Application of a Signal Detector in a Matched Filter

It is contemplated that the foregoing signal detector can be beneficially employed in a variety of applications, such as in a GPS receiver. The present invention is particularly applicable to low $C/N_0$ or duty-cycled, low power operation applications of a GPS receiver in which the GPS waveform is not tracked continuously, but only intermittently. In applications such as this, information about bit synchronization, the location of data epochs, and phase reversals at the data epochs is not directly available from the GPS waveform itself, but must be derived from another source, such as a cell or PCS phone network or base station, or a local clock periodically synchronized with the atomic clocks maintained on the GPS satellites.

a. Components and Component Operation of a Matched Filter Embodiment

Figure 10:
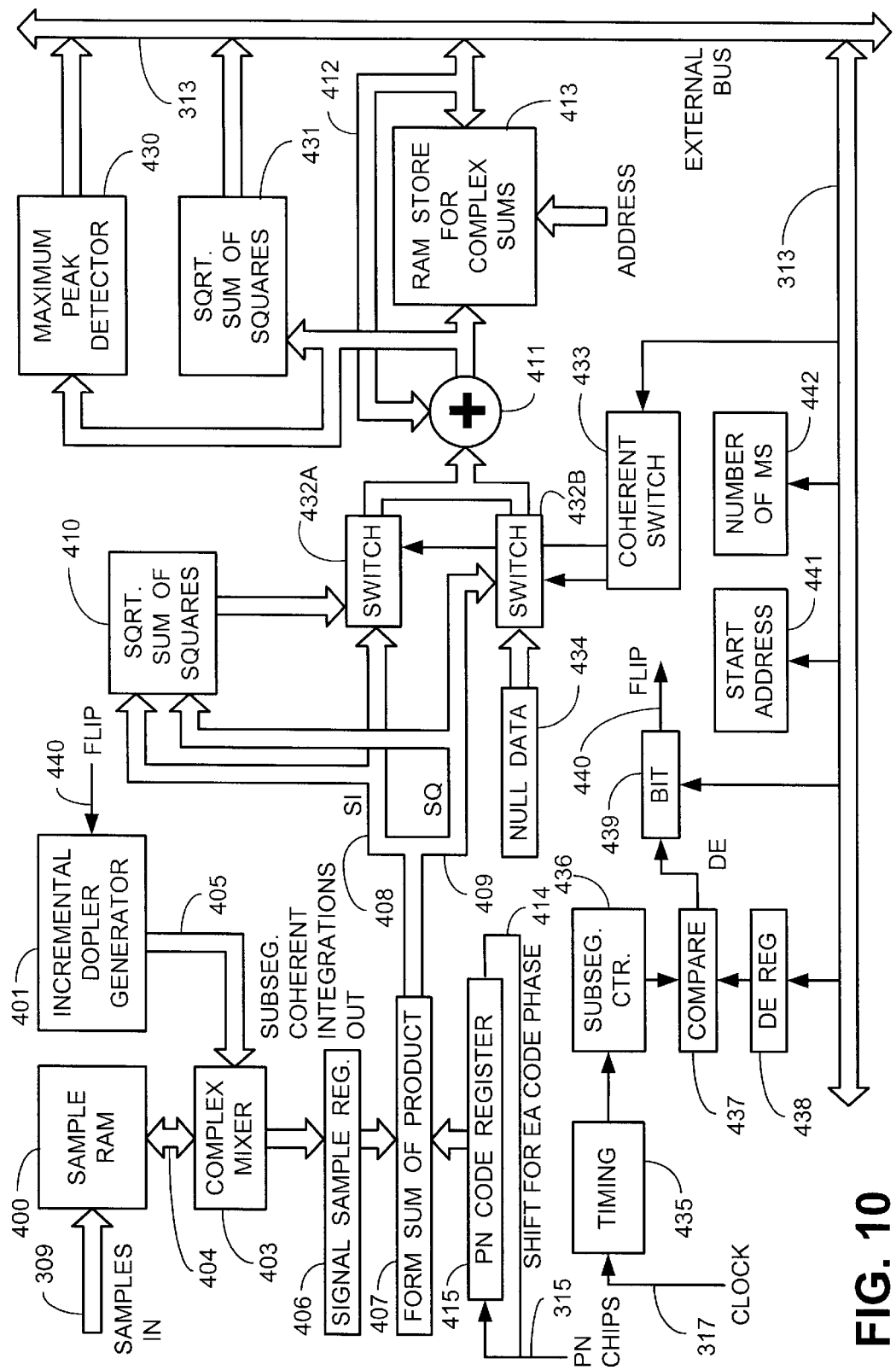
FIG. 10 illustrates an embodiment of a matched filter in accordance with the subject invention.

FIG. 10 illustrates one embodiment of matched filter 310 in FIG. 8. Compared to FIG. 8, like elements in FIG. 10 are referenced with like identifying numerals. As illustrated, this embodiment of the matched filter comprises random access memory (RAM) 400 which is configured to receive a segment of samples from sampling circuitry 308 (FIG. 8) over signal line 309 (See also FIG. 8). In one implementation example, a segment is 20 mS in duration, the same as the frame duration, and the RAM 400 is configured to receive one 20 mS segment of samples at a time. According to this implementation example, each 20 mS segment of samples comprises 40920 samples, obtained by sampling the baseband signal at a nominal sampling rate of 20.46 MHz, and then performing decimation filtering. Note that, in this implementation example, although a segment has the same duration as a frame, in general, frame boundaries will not occur synonymously with segment boundaries, and in fact, will typically occur between segment boundaries.

Each sample is a complex sample having an in-phase (I) component and a quadrature (Q) component which can be represented in complex form as I+jQ. In one implementation example, each component can take on the values −1, 0, and +1, and thus can be represented with 2 bits. In this implementation example, each sample can be represented with 4 bits, and a 20 mS frame of samples requires 40,920×4 bits=163 K bits of RAM 400 for the storage thereof.

In one implementation, the matched filter of FIG. 10 is configured to divide up the segment of samples in to 1 mS incremental portions or subsegments, the same duration as the PN code period, and to process a 1 mS subsegment at a time. In this implementation example, each 1 mS subsegment of samples comprises 2046 samples, each having I and Q components, each such component represented by 2 bits.

The matched filter further comprises complex mixer 403, and incremental Doppler generator 401. In one implementation, the RAM 400 is configured to provide to complex mixer 403 over signal line 404 a 1 mS subsegment of samples from the segment stored therein at a time.

Incremental Doppler generator 401 generates a plurality of Doppler shift hypotheses which are provided to complex mixer 403 over signal line 405 one hypothesis at a time. In one implementation example, the incremental Doppler generator 401 generates Doppler shift hypotheses in the range of ±62,000 Hz, to allow for inaccuracy in the local time base that is not corrected by the input sampling process.

Complex mixer 403 receives a subsegment of samples from RAM 400 over signal line 404, and a Doppler shift hypothesis from incremental Doppler generator 401, and, responsive thereto, multiplies the samples by a complex phasor of the form $e^{jw_d t}$ where $W_d$ represents the Doppler shift hypothesis provided by incremental Doppler generator 401. A Doppler-corrected subsegment of samples results which are stored in sample register 406. Additional detail about this procedure is available in U.S. patent application Ser. No. 09/145,055, filed Sep. 1, 1998, entitled "DOPPLER CORRECTED SPREAD SPECTRUM MATCHED FILTER," previously incorporated by reference herein as though set forth in full.

In one implementation example, each corrected subsegment of samples continues to comprise 2046 complex samples, each having I and Q components, which can be represented in combination as I+jQ, and each of which can take on any one of the discrete values −2, −1, 0, +1, and +2. In this implementation example, each component requires 3 bits for the representation thereof, and thus the 2046 samples in a corrected subsegment requires 2046×6 bits=12,276 bits in register 406 for the storage thereof.

PN code register 415 is provided to store the current PN code hypothesis provided by PN code generator 312 (FIG. 8) over signal line 315. In one implementation, each PN code hypothesis represents one period of a PN code. In one implementation example, the PN code period is 1 mS, and each PN code hypothesis represents 1023 chips which repeats every 1 mS, representing a chip rate of 1.023 MHz. In this implementation example, the PN code register 415 is configured to store 1023 chips at a time.

As indicated by signal line 414, the PN code register 415 is capable of being circularly shifted by an amount which corresponds to a code phase delay hypothesis. In the implementation example which has been discussed, in which the period of a PN code is 1023 chips, the value of the code phase delay can range from 0 to 2045 half chip increments. The PN code register 415 is configured in this implementation example to be circularly shifted by any number or fraction of chips which correspond to a code phase delay hypothesis under consideration.

Sum of products circuitry 407 is also provided. This circuitry is configured to form the coherent integration of the product between the subframe of corrected samples stored in sample register 406 and the PN code hypothesis stored in the PN code register 415.

In the implementation example discussed earlier in which the subsegment of samples stored in sample register 406 comprises 2046 samples, each having I and Q components, and the PN code hypothesis stored in PN code register 415 comprises 1023 chips, a correspondence is present between two of the samples in the sample register 406, and one of the chips in PN code register 415. The I and the Q components of each of the two samples is multiplied by the corresponding PN chip. Then, the sum of the I component products is determined, and the sum of the Q component products is separately determined. The sum of the I component products is output on signal line 408, and the sum of the Q component products is output on signal line 409.

In equation form, the function of the sum of products circuitry 407 in this implementation example can be represented as follows:

$$SI = \sum_{i=1}^{1023} CHIP_i \times (I_i^1 + I_i^2) \quad (1)$$

$$SQ = \sum_{i=1}^{1023} CHIP_i \times (Q_i^1 + Q_i^2) \quad (2)$$

where $CHIP_i$ is the ith chip in the PN code hypothesis, $I_i^1$ is the I component of the first of the two samples corresponding to $CHIP_i$, $I_i^2$ is the I component of the second of the two samples corresponding to $CHIP_i$, $Q_i^1$ is the Q component of the first of the two samples corresponding to $CHIP_i$, and $Q_i^2$ is the Q component of the second of the two samples corresponding to $CHIP_i$.

b. Coherent and Non-Coherent Operation in a Matched Filter Embodiment

The matched filter is capable of two modes of operation controlled by the state of coherent switch 433. The state of coherent switch 433 can be set to either "0" or "1" by GPS processor 303 (FIG. 8). In a first mode of operation, defined when the state of switch 433 is set to "1", the matched filter is configured to coherently integrate the SI and SQ values which have been computed with corresponding SI and SQ values determined for previous subsegments. In a second mode of operation, defined when the state of switch 433 is set to "0", the matched filter is configured to non-coherently integrate the SI and SQ values which have been computed with corresponding SI and SQ values for previous subsegments.

The state of switch 433 controls the state of switches 432A and 432B. When switch 433 is set to "1", switches 432A and 432B are configured to pass directly to complex adder 411 the SI and SQ values from signal lines 408 and 409, respectively. When switch 433 is set to "0", switches 432A is configured to pass the output of sqrt. of sum of squares circuit 410 to complex adder 411, and switch 432B is configured to provide a null value to complex adder 411.

Complex adder 411 is configured to perform a complex addition of the two complex values provided at its two inputs, and to store the result in complex RAM 413.

One of the inputs to complex adder 411 is provided from complex RAM 413 over signal line 412. The other input is provided from switches 432A and 432B. The sqrt. of sum of squares circuit 410 is configured to receive the SI and SQ values on signal lines 408 and 409 respectively, and to compute the square root of the sum of the squares of these two values. In equation form, the circuit computes the value:

$$SS = \sqrt{(SI)^2 + (SQ)^2} \quad (3)$$

Sqrt. of sum of squares circuit 431 is configured to receive a complex number from complex RAM 413 and compute the magnitude thereof, that is, the square root of the sum of the squares of the real and imaginary components thereof, or equivalently, the sum of the squares of the real and imaginary components. The result can then be stored back in complex RAM 413 through bus 313.

Peak detector 430 is configured to receive a plurality of correlation values from RAM 413, and, responsive thereto, select a maximum thereof. Once selected, the maximum value is provided to bus 313, whence it can be provided to GPS processor 303, or to complex RAM 413.

C. Timing Methods of a Matched Filter Embodiment

Timing circuitry 307 (FIG. 8) provides a clock to timing circuit 435 over signal line 317. Responsive thereto, timing circuit 435 generates a timing pulse for every subsegment. Counter 436 receives the timing pulses from timing circuit 435, and responsive thereto, counts the number of subsegments which have been processed by the matched filter 310 (FIG. 8). Register 438 stores the subsegment number at which the next frame boundary will occur. It is configured to be loaded with this number by GPS processor 303 (FIG. 8) over bus 313. In one implementation, in which a segment duration is 20 mS, and the subsegment duration is 1 mS, a segment boundary will occur every 20 subsegments.

Bit circuitry 439 is configured to store the value of the data signal modulated onto the signal of interest beyond the next frame boundary. It is configured to be loaded with this value by GPS processor 303 (FIG. 8) over bus 313. Bit circuitry 439 is also configured, responsive to the detection of a frame boundary by compare circuit 437, and the state of the next data bit, to determine whether there will be a phase reversal in the signal of interest at the segment boundary. If the data signal does not change state at the frame boundary, then there will not a phase reversal at the frame boundary. Conversely, if the data signal changes state at the frame boundary, there will be a phase reversal at the frame boundary.

If there is a frame reversal at the frame boundary, the flip signal output from the bit circuitry 439 is asserted. This flip signal is also provided as an input to incremental Doppler generator 401. Responsive to the assertion of this signal, incremental Doppler generator 401 flips the sign of the complex phasor that is multiplied by the current subsegment of samples by complex mixer 403. Thus, if the sign of the phasor is positive, and the flip signal is then asserted, the sign of the complex phasor will become negative. In equation form, the complex phasor will go from $e^{jw_d t}$ to $-e^{jw_d t}$. Conversely, if the sign of the phasor is negative, and the flip signal is then asserted, the complex phasor will go from $-e^{jw_d t}$ to $e^{jw_d t}$. When the modified phasor is multiplied by the incoming samples by complex mixer 403, a phase reversal of the samples is implemented to counteract the phase reversal caused by the change of state of the data signal at the frame boundary.

The data epoch timing and data bit values stored respectively in DE register 438 and bit circuitry 439 is typically derived from a source other than the GPS waveform from which the samples stored in RAM 400 are derived.

In one embodiment, this information is derived from an accurate clock maintained in the GPS receiver and periodically synchronized with the atomic clocks maintained on the GPS satellites to preserve data epoch timing and data values.

In another embodiment, the GPS receiver would be normally operated in a continuous mode of operation, and then switched to an intermittent mode of operation when low power operation is desired or the C/No value of the received signal is low, such as the case in which the receiver enters a building. A local clock would be synchronized with the atomic clocks maintained at the GPS satellites to provide accurate data epoch timing and data values when the GPS receiver is operating in the continuous tracking mode of operation. The local clock would be capable of providing accurate information about data epoch timing and data values during the time the receiver is operated in an intermittent mode of operation.

In another embodiment, this information is derived from another source external to the GPS receiver, such as a cellular or PCS phone network or base station. Cellular or PCS networks commonly track the GPS satellites, and are capable of providing this information to a GPS receiver.

In yet another embodiment, the GPS receiver would be periodically operated in a continuous tracking mode of operation to collect ephemeris and almanac data. Ephemeris collection takes 18 seconds and must be done about once an hour. Almanac collection take 6 seconds each and must be collected weekly for each of the 24 satellites.

The almanac data is normally constant for a week time and ephemeris data is normally constant over a period of one hour. Consequently, once this information is collected, it can be used to predict data phase changes as a function of time.

d. Accounting for Unexpected Changes in Data

There is one aspect that must be considered in this method. Although the ephemeris data normally changes at the top of each hour and the almanac data changes at a known time of the week, the GPS system allows for arbitrary times of changes when necessary. These events normally occur when the GPS control segment uploads new data to the satellites. These uploads occur when the satellites pass over the uplink ground stations, which is typically not at the normal changeover times. Therefore, unexpected changes in the data needs to be accounted for.

Registers 441 and 442 (FIG. 10) are used to store, respectively, the start address of the samples in the segment of samples stored in RAM 400 that integration is to start at, and the number of mS that the integration is to proceed over. These two registers are loadable by GPS processor 303 (FIG. 8) over bus 313. Together, they are used to define an arbitrary portion of the current segment over which integration is to proceed.

In a first mode of operation, switch 433 is set to "1", indicating that coherent integration is to be carried out. A segment of complex samples is stored in RAM 400. One subsegment at a time, the samples are multiplied by a complex phasor to correct for Doppler shift and stored in sample register 406. The samples are then multiplied by the PN code stored in register 415, and the SI and SQ sum of products values computed by circuitry 407. The SI and SQ values are then provided over signal lines 408 and 409 respectively, and added by complex adder 411 to any corresponding values previously stored in complex RAM 413 for previous subsegments of the segment stored in RAM 400.

If the subsegment under consideration and stored in sample register 406 is the first subsegment for the segment of interest, the foregoing values are stored in an array entry in RAM 413 corresponding to the combination of the PN code, Doppler shift, and code phase hypotheses under consideration. The arrays are of the same format as those depicted in FIG. 11 and will eventually become the correlation arrays for the current segment of samples in RAM 400.

If the subsegment under consideration and stored in sample register 406 is not the first subsegment analyzed for the segment of interest, there may already be a value derived from a previous subsegment stored in RAM 413 in the entry corresponding to the combination of the PN code, Doppler shift, and code phase hypotheses under consideration. In this case, the SI and SQ values determined above are added by adder 411 to the previously stored values for the entry which are provided to the adder 411 over signal line 412. The result is then stored in lieu of the previously stored values in the array entry corresponding to the combined PN code, Doppler shift, and code phase hypotheses.

Figure 12:
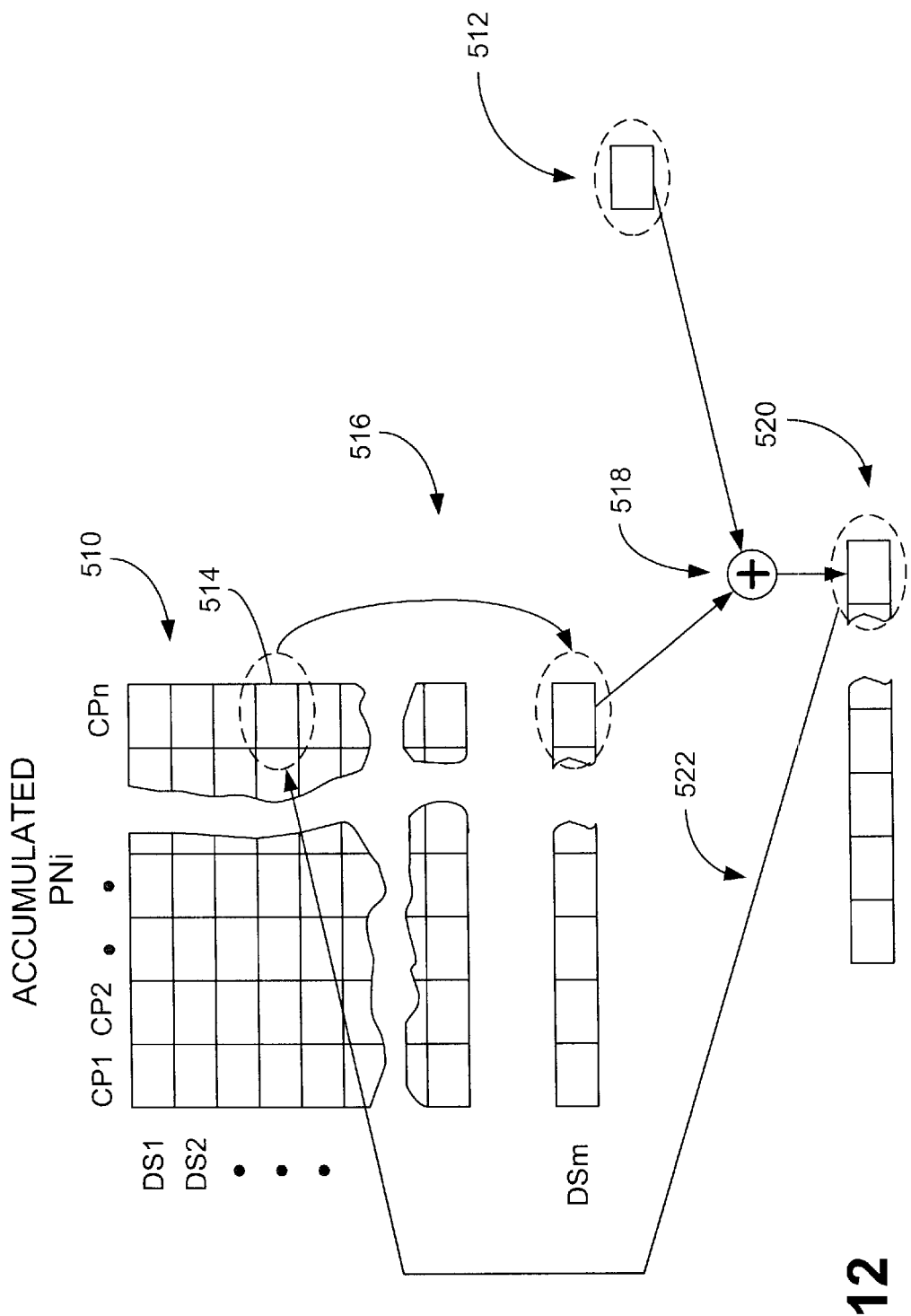
FIG. 12 illustrates the process of updating data structures in one embodiment of a matched filter in accordance with the subject invention.

This process is illustrated in FIG. 12. An array 510 represents cumulative values which are stored in memory 413 (FIG. 10) for previous subsegments of the segment under consideration. Register 512 contains SI and SQ values derived from the current subsegment for a particular PN code, Doppler shift, and code phase hypothesis. FIG. 12 illustrates the procedure for updating the cumulative SI and SQ values for entry 514 in array 510 with the corresponding values identified by numeral 512. These cumulative values are retrieved, as indicated by identifying numeral 516, and then added to the corresponding values identified by register 512. This addition step is identified by numeral 518. The resulting values, in register 520, are then restored in lieu of the original values stored in entry 514. This procedure of updating the entry 514 with the contents of register 512 is represented by arrow 522 in FIG. 12.

The next code phase hypothesis is then selected, and the PN code register 415 (FIG. 10) circularly shifted in accordance with the selected code phase hypothesis. The foregoing process is then repeated for the next code phase hypothesis. This process continues for each of the code phase hypotheses which are desired to be tested for the current PN code and Doppler shift hypotheses. In one implementation, 2046 code phases are tested for each 1 mS subsegment, corresponding to the repetition period of the PN codes. In this implementation, the code phase hypotheses which are tested range from 0 to 2045 half-chip increments, and the next code phase hypothesis is selected simply by circularly shifting the PN code register 415 by one-half chip.

The foregoing process is repeated for each of the PN code and Doppler shift hypotheses to be tested. In this manner, the arrays of correlation values stored in RAM 413 (FIG. 10) are incrementally updated with the values derived for the current subsegment. When all the desired hypotheses have been tested for the current subsegment, the foregoing process is repeated for the next subsegment stored in RAM 400. If a subsegment falls on a frame boundary, and there is a phase flip at the boundary, the flip signal 440 is asserted, causing a change in sign of the complex phasor which will be multiplied by ensuing subsegments of samples. The result is that the phase reversals are accounted for such that the SI and SQ values derived from these subsequent subsegments will add constructively, rather than destructively, to the values accumulating in the correlation arrays stored in RAM 413.

The foregoing process is repeated for each of the subsegments within the portion of the current segment which is defined by the values in registers 441 and 442 (FIG. 10). When this process has been completed, correlation arrays of the form shown in FIG. 11 are present in RAM 413 (FIG. 10). These correlation arrays are provided to the GPS processor 303 over signal line 313. GPS processor 303 (FIG. 8) uses these correlation arrays to detect the presence and range of satellites in the manner described previously.

In the second mode of operation, defined to be when the switch 433 (FIG. 10) is set to "0", the SI and SQ values for the current subsegment are combined noncoherently with corresponding values for previous subsegments in the current segment. Square root of the sum of the squares circuitry 410 forms the SS value from the current SI and SQ values. This SS value is then passed through switch 432a to complex adder 411, whereupon it becomes the real part of the first input to the complex adder 411. The imaginary part of this first input is the null value 434 which is passed through switch 432b. This value is then added to a corresponding value stored in cumulative correlation arrays maintained in RAM 413 in a procedure similar to that described earlier in relation to FIG. 12, except that only real values are maintained in the arrays rather than complex values.

Third and fourth modes of operation are also possible for the case in which bit circuitry 439 (FIG. 10) is not provided, and a phase reversal at a frame boundary cannot be detected, although the frame boundary itself can. In one implementation, the detection of the frame boundary is performed by comparator 437, which asserts an output signal when a frame boundary is encountered. In one implementation example, a frame boundary is referred to as a data epoch.

In the third mode of operation, the object is to perform a first coherent integration for the portion of the segment up to the frame boundary, and to perform a second coherent integration for the portion of the segment beyond the frame boundary, and then to noncoherently combine the two integrations. In one implementation, in which a segment has the same duration as a frame, there will be at most one frame boundary encountered as integration proceeds across the segment. In this implementation two sets of arrays of the form shown in FIG. 11 are maintained for the current segment. One set of arrays is complex, and is used to accumulate the coherent integration values in the manner described earlier in relation to the first mode of operation. The second set of arrays is real, and is used to noncoherently combine the coherent integrations performed on either side of the frame boundary.

When a frame boundary is encountered, the values in each of the entries in these arrays is put into noncoherent form by circuitry 431 (FIG. 10), that is, by computing the square root of the sum of the squares of the real and imaginary values stored in each entry. These values are then stored in the corresponding entries in the second set of arrays. The first sets of arrays are all then reset to zero. Coherent integration is then resumed, and the results thereof accumulated in the first set of arrays. When this has been completed, the values of the first set of arrays are put into noncoherent form in the manner described above. These values are then added to the corresponding values stored in the second set of arrays. The second set of arrays thus becomes the correlation values for the segment.

In the fourth mode of operation, the object is to perform coherent integration up to a frame boundary, and to continue coherent integration beyond that point under two alternative hypotheses, one assuming that there has been no phase reversal at the frame boundary, and the other assuming there has been a phase reversal at the frame boundary.

In the one implementation, in which the segment duration is the same as the frame duration, there will be at most one frame boundary within a segment. In this implementation, two sets of arrays of the form shown in FIG. 11 are maintained in RAM 413 (FIG. 10) for the current segment. Both are complex. The first set of arrays is used to accumulate the results of coherently integrating up to the frame boundary in the manner described. When the frame boundary is detected, the accumulated results are copied into the second set of arrays. Coherent integration is then resumed for the remaining portion of the segment beyond the frame boundary. The first set of arrays is used to accumulate results under the hypothesis that there has been no phase reversal at the frame boundary. The second set of arrays is used to accumulate results under the hypothesis that there has been no phase reversal at the frame boundary. In one implementation, this is accomplished by flipping back and forth the sign of the complex phasor used by mixer 403 to correct for Doppler shift. A set of SI and SQ results are obtained for the current subsegment while leaving the sign of the complex phasor unchanged. These results are then coherently added to corresponding entries maintained in the first set of arrays. A second set of SI and SQ results are then obtained for the current subsegment while flipping the sign of the complex phasor. These results are then coherently added to corresponding entries maintained in the second set of arrays.

When this process has been completed for the current segment, peak correlator 430 (FIG. 10) is then employed to determine which of the two sets of arrays represents the greater degree of correlation with the segment. In one implementation, the array is selected which has one or more correlation values significantly higher than any of the correlation values in the other array. The hypothesis corresponding to this array is then determined to be the correct one. The sign of the complex phasor is then set accordingly, and the arrays for that hypothesis are provided to GPS processor 303 (FIG. 8) for satellite presence and range detection.

e. Methods of Coherent Integration in a Matched Filter Embodiment

Figure 13A:
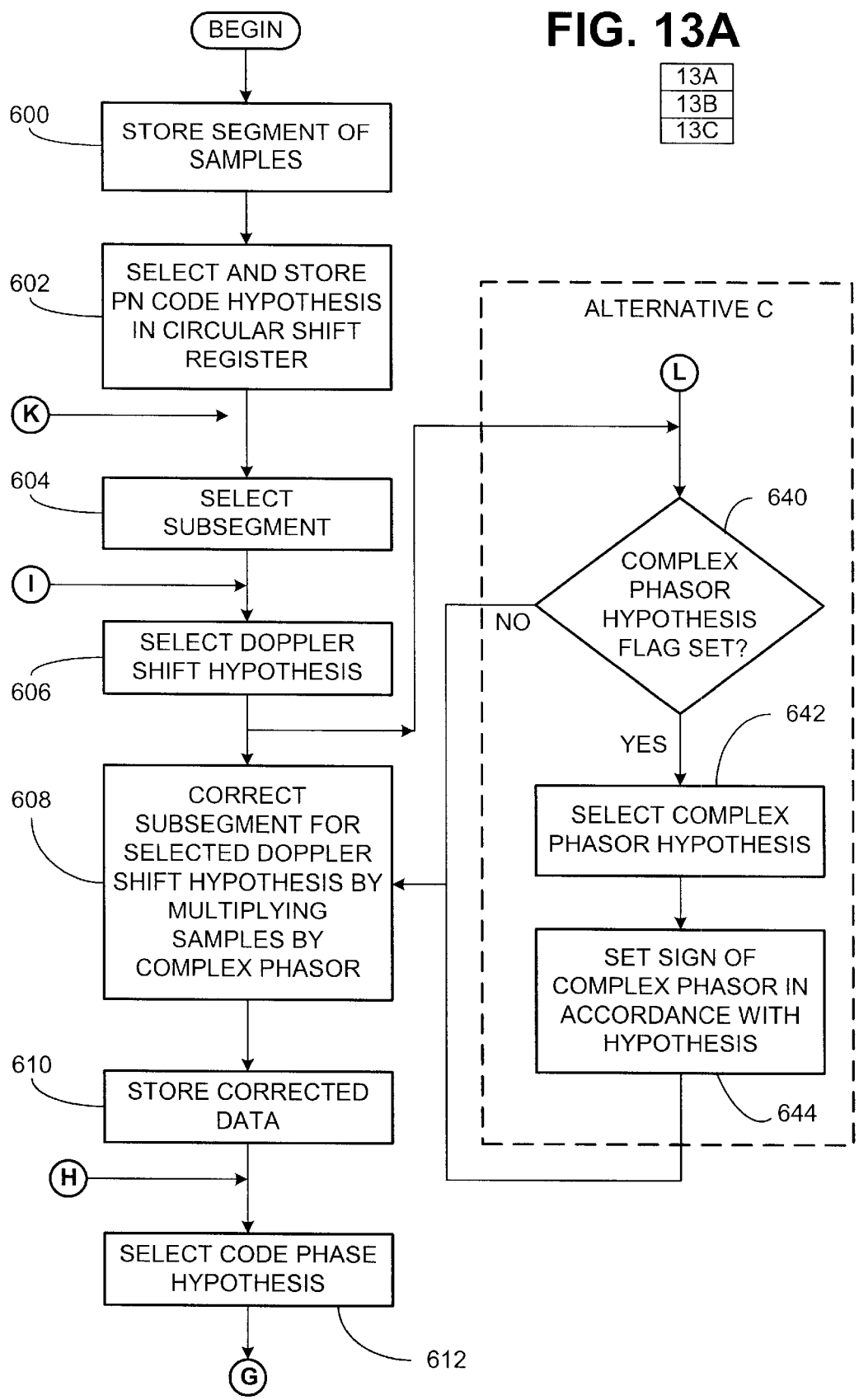
FIGS. 13A–13C illustrates three alternative embodiments of a method of operation of a matched filter in accordance with the subject invention.
Figure 13B:
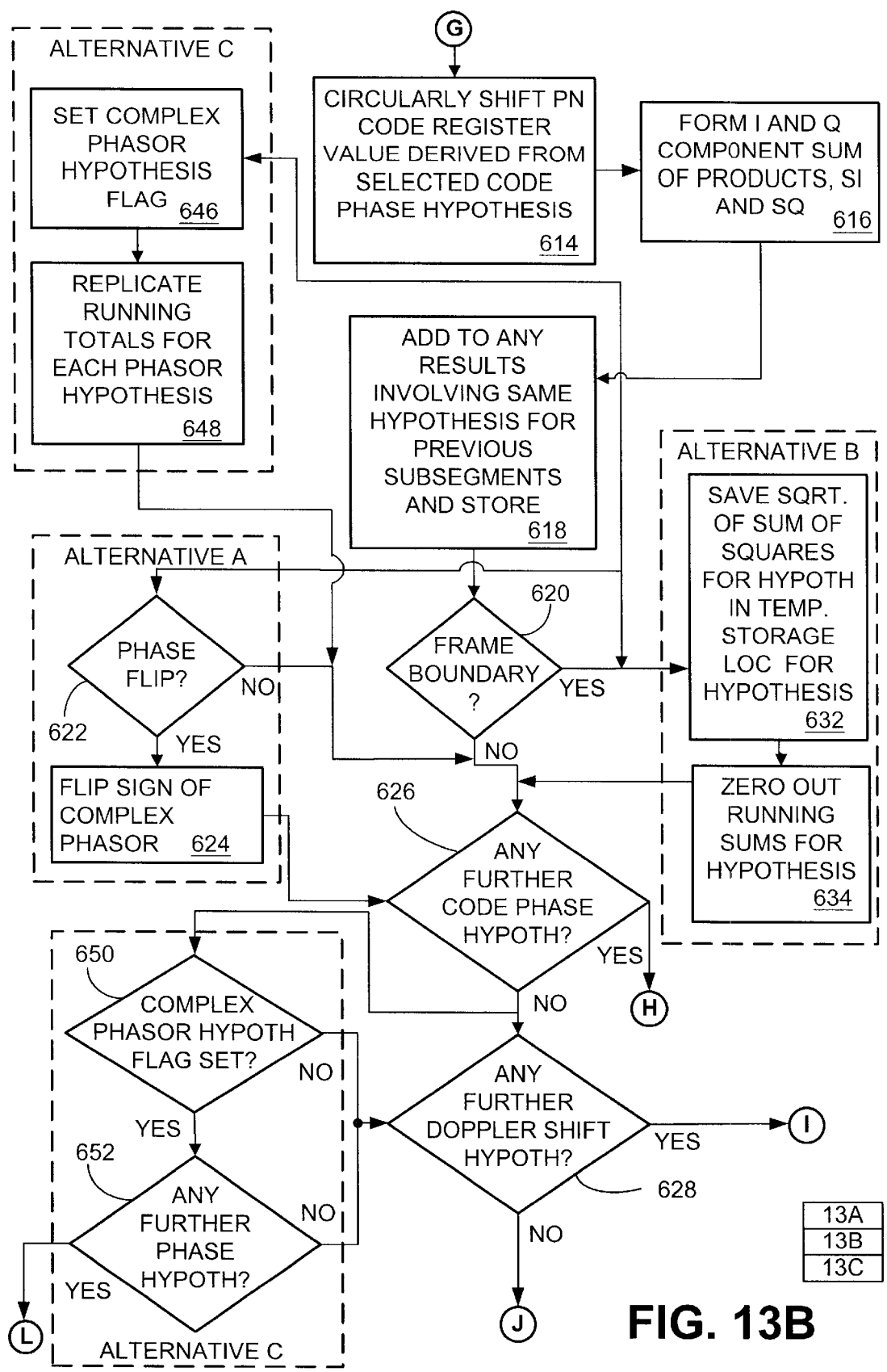
Figure 13C:
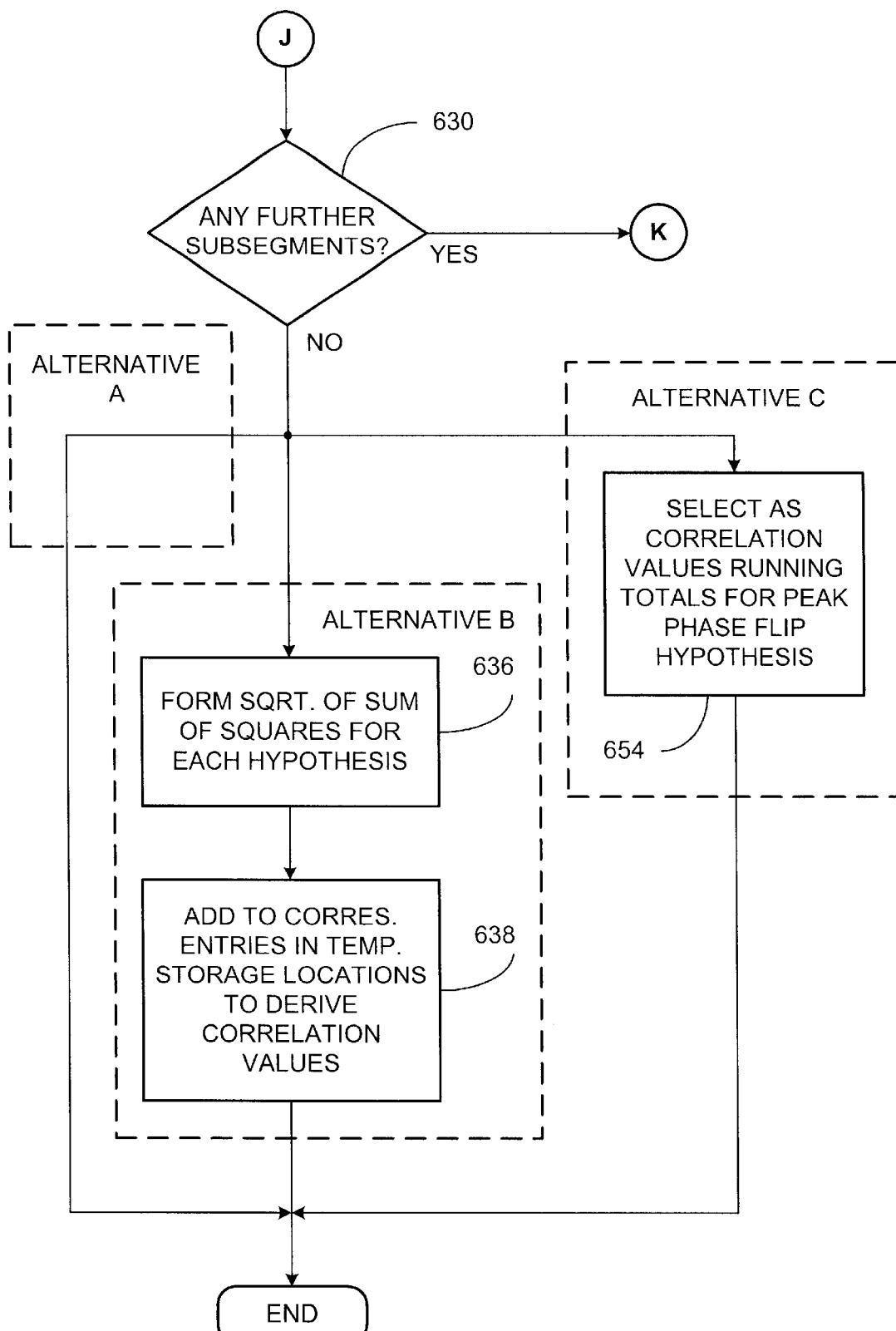

A method of operation of one embodiment of a matched filter in accordance with the subject invention is illustrated in FIGS. 13A—13C. Three alternative modes of operation are illustrated: alternatives A, B, and C, each involving coherent integration. Alternative A corresponds to the first mode of operation discussed above in which phase reversals at frame boundaries can be detected, and coherent integration is performed across frame boundaries after account is taken of any phase reversal that may have taken place at the frame boundary.

Alternative B corresponds to the third mode of operation discussed above, in which frame boundaries, but not phase reversals, can be detected, first and second coherent integrations are performed on either side of the frame boundary, and then the results thereof noncoherently combined.

Alternative C corresponds to the fourth mode of operation discussed above, in which frame boundaries, but not phase reversals, can be detected, coherent integration is performed across a frame boundary under two alternative hypotheses, and then the hypothesis chosen which yield the best correlation results with the segment.

The method of FIGS. 13A—13C will be explained in the following order: Alternative A, Alternative B, and Alternative C.

In step 600 (FIG. 13A), a segment of samples is stored. The samples are complex samples having real and imaginary components, or equivalently, magnitude and phase components. In one implementation, each sample has I and Q components. In the matched filter of FIG. 10, the segment of samples is stored in RAM 400.

In step 602, a PN code hypothesis is selected for testing and stored in a circular shift register. In the matched filter of FIG. 10, the PN code hypothesis is stored in PN code register 415.

In step 604, a subsegment of the segment of samples stored in step 600 is selected.

In step 606, a Doppler shift hypothesis is selected for testing. In the matched filter of FIG. 10, this step is implicitly performed by incremental Doppler generator 401 which successively generates Doppler shift hypotheses responsive to constraints or bounds imposed by a user. In one implementation example, the Doppler shift hypotheses range from ±62,000 Hz.. In another implementation example, the Doppler shift hypotheses range from ±4,500 Hz.

In step 608, the subsegment selected in step 604 is corrected for the Doppler shift hypothesis selected in step 606. In the matched filter of FIG. 10, this step is performed by complex mixer 403, which multiplies the subsegment of samples by a complex phasor. In one implementation example, this step is performed as described in U.S. Ser. No. 09/145,055, previously incorporated herein by reference.

In step 610, the corrected data from step 608 is stored, In the matched filter of FIG. 10, the corrected data is stored in sample register 406.

In step 612, a code phase hypothesis is selected for testing. In the matched filter of FIG. 10, this step is implicit in the operation of PN code register 415 which successively and circularly shifts through each of the possible code phase hypotheses in a PN code repetition period, which, in one implementation, comprises 2046 half-chip increments.

In step 614 (FIG. 13B), the PN code hypothesis selected and stored in step 602 is circularly shifted by an amount derived from the code phase hypothesis selected in step 612. In the matched filter of FIG. 10, the selected code phase hypothesis ranges from 0 to 2045 half-chip increments, and step 614 is implemented by circularly shifting the PN code hypothesis by the number of half-chip increments comprising the selected code phase hypothesis.

In step 616, the product of the shifted PN code from step 614, and the corrected subsegment of samples from step 608 is obtained. In one implementation, this step comprises forming the I and Q component sum of products, SI and SQ. In one implementation example, SI and SQ are derived in accordance with equations (1) and (2), presented earlier. In the matched filter of FIG. 10, this step is performed by sum of products circuitry 407.

In step 618, the SI and SQ values are added to any corresponding values for the same hypotheses as applied to previous subsegments from the segment stored in step 600. In one implementation, cumulative correlation arrays of the form shown in FIG. 11 are maintained for the segment, and the SI and SQ values determined in step 616 are added to corresponding values maintained in these arrays in accordance with the procedure illustrated in FIG. 12. In the matched filter of FIG. 10, this step is performed by complex adder 411, and the cumulative arrays for the segment are maintained in complex RAM 413.

In step 620, a determination is made whether a frame boundary has been encountered. If so, for Alternative A, step 622 is performed. In step 622, a determination is made whether there is a phase reversal at the frame boundary. If so, step 624 is performed. If not, a jump is made to step 626. In step 624, the sign of the complex phasor employed in step 608 for Doppler correction is flipped. Step 626 is then performed.

In step 626, a determination is made whether there are any further code phase hypotheses which are to be tested for the selected PN code and Doppler shift hypotheses. If so, a jump is made to step 612 and the process beginning at this point repeated for the new code phase hypothesis. If not, step 628 is performed. In the matched filter of FIG. 10, this step is implicit in the operation of PN code register 414, which successively shifts through the 2046 code phase hypotheses to be tested for a given PN code and Doppler shift hypothesis.

In step 628, a determination is made whether there are any further Doppler shift hypotheses which are to be tested for the selected PN code hypothesis. If so, a jump is made to step 606, and the process beginning at this point repeated for the new Doppler shift hypothesis. If not, step 630 is performed. In the matched filter of FIG. 10, this step is implicit in the operation of incremental Doppler generator 401, which cycles through a plurality of Doppler shift hypotheses for a given PN code hypothesis. In one implementation example, the Doppler shift hypotheses tested for a given PN code hypothesis range from ±62,000 Hz.

In step 630, a determination is made whether there are any further subsegments to be analyzed for the segment which was stored in step 600. If so, a jump is made to step 604, and the process beginning at this point repeats itself using the new subsegment. If not, for Alternative A, the process terminates. At this point, a plurality of complex correlation values are available for further analysis, one complex value corresponding to each of the combinations of PN code, Doppler shift, and code phase hypotheses tested. In the matched filter of FIG. 10, these values are stored in RAM 413, and are available to GPS processor 303 (FIG. 8) over bus 313. In one implementation example, these values are in the form of arrays as illustrated in FIG. 11.

In one functionally-equivalent variant of the foregoing, the order of blocks 604 and 606 is reversed, as well as that of blocks 628 and 630. A benefit of this approach—processing all the subsegments first before changing the Doppler hypothesis—is that it permits a smaller RAM 400 (FIG. 10) to be used. Under the opposite ordering—in which all the Doppler hypotheses for a given subsegment are processed first—the RAM size would need to be expanded by a factor equal to the number of Doppler hypotheses.

Alternative B will now be described. Steps 600–618 are identical to those described earlier in relation to Alternative A, and the explanation thereof need not be repeated. In step 620, when a frame boundary is detected 622 for Alternative B, step 632 is performed. In step 632, a second set of arrays is created for the segment of interest, with entries for each of the combinations of PN code, Doppler shift, and code phase hypotheses tested. In one implementation, the second set of arrays is real rather than complex. The magnitude of each complex entry in the first set of arrays is computed by taking the square root of the sum of squares of the real and imaginary components, and the resulting value is stored in the corresponding entry in the second set of arrays. In the matched filter of FIG. 10, this step is performed by circuitry 431. This procedure is repeated for each of the entries in the first set of arrays.

Step 634 is then performed. In step 634, each entry in the first set of arrays is zeroed out. The process then proceeds beginning with step 626. Steps 626–628 are then performed in an identical manner to the like-numbered steps explained earlier in relation to Alternative A, and the explanation thereof need not be repeated here. In step 630, if it is determined that further subsegments remain for consideration, a jump is made to step 604 (FIG. 13A), and the process repeats itself at this point. As shown in FIG. 13C, if there are no remaining subframes to be considered, steps 636 and 638 are performed. In step 636, the magnitude of each of the complex values comprising the first set of arrays is computed in the manner previously described, and in step 638, the magnitude of a value is added to the corresponding value stored in the second set of arrays. In the matched filter of FIG. 10, this step is performed by circuitry 431 in combination with complex adder 411. This procedure is repeated for each of the values in the first set of arrays. At this point, the second set of arrays comprises the correlation values for the segment. In one implementation, the second set of arrays is stored in RAM 413 (FIG. 10), and is accessible by GPS processor 303 (FIG. 8).

Alternative C will now be described. In Alternative C, steps 600–606 are performed in the manner described above. Step 640 is then performed. In step 640, a determination is made whether a complex phasor hypothesis flag has been set. As will be seen, this flag is normally cleared, and is set to a logical "1"when a frame boundary is encountered. When this event occurs, the first set of arrays being maintained for the segment is duplicated into a second set of arrays. Then, all the PN code, Doppler shift, and code phase hypotheses to be tested are run on a given subsegment twice. The first run is performed under the hypothesis or assumption that there is no phase change at the frame boundary. In the first run, the phase of the complex phasor employed in step 608 is left unchanged. The second run is performed under the hypothesis or assumption that there is a phase change at the frame boundary. In the second run, the phase of the complex phasor employed in step 608 is flipped.

In step 640, if the phasor flag is not set, indicating that a frame boundary has not yet been encountered, a jump is made back to step 608, and the process resumes as before. If the phasor flag has been set, indicating that a frame boundary has been encountered, step 642 is performed. In step 642, one of the two hypotheses discussed above regarding the phase change, or lack thereof, at the frame boundary is selected. Step 644 is then performed. In step 644, the sign of the complex phasor employed in step 608 is either left unchanged or flipped depending on which of the two hypotheses regarding phase is selected in step 642.

The process then proceeds through steps 608–618 in the manner described above in relation to the other alternatives. Step 620 is then performed. As shown in FIG. 13B, in step 620, if a frame boundary is encountered, steps 646 and 648 are performed. In step 646, the complex phasor hypothesis flag discussed earlier in relation to step 640 is set to logical "1", and in step 648, the data maintained in the first set of arrays being maintained for the current segment is replicated into a second set of arrays in the manner described above. At step 620, if a frame boundary is not encountered, the process proceeds directly to step 626.

Step 628 is then performed. In step 628 as previously described, a determination is made whether there are any further code phase hypotheses which are to be tested for the selected PN code and Doppler shift hypotheses. If so, a jump is made to step 612 and the process beginning at this point is repeated for the new code phase hypothesis. If not, step 650 is performed. In step 650, a determination is made whether the complex phasor hypothesis flag is set. If so, step 652 is performed. If not, step 628 is performed as previously described.

In step 652, a determination is made whether there are any more phase hypotheses to be tested for the current subsegment. If so, the process jumps to step 640 (FIG. 13A), and resumes at this point. If not, step 628 is performed as previously described.

As shown in FIG. 13C, in step 630, a determination is made whether there are any further subsegments to be analyzed. If so, the process jumps to step 604 (FIG. 13A), and resumes at this point. If not, step 646 is performed. In step 646, a determination is made which of the phase hypotheses tested is the correct one for the segment. In one implementation, this step is performed by selecting the hypothesis which yields correlation values that are substantially greater than correlation values for the alternate hypothesis. Once the phase hypothesis is selected, the correlation values for that hypothesis are selected as the correlation values for the segment. In one implementation, in which first and second sets of arrays are maintained for two alternate phase hypotheses, the correlation data for the segment will comprise one or the other of the two sets of arrays.

Note that the foregoing description of the methods for Alternatives B and C needs to expanded for the case in which there is more than one frame boundary in a particular segment. In that event, in the case of Alternative B, upon encountering the subsequent frame boundaries, in step 632 (FIG. 13B), the magnitude values created for the first set of arrays are added to corresponding values in the second set of arrays rather than being used to initialize those values. In the case of Alternative C, instead of just two phasor hypotheses to be tested, there will be an exponential number to be tested equal to $2^{n-1}$, where n is the number of frame boundaries encountered in a segment. Accordingly, in step 648 (FIG. 13B), the first set of arrays needs to be replicated $2^{n-1}$ times such that each phasor hypothesis has a corresponding set of arrays maintained. In step 646, one of the hypotheses corresponding to these arrays is then selected as the correct one.

A related issue is integrations performed across multiple segments. In this event, there will be a number of intervening frame boundaries (and data bits) to account for, as well as the complex phase change due to the Doppler hypothesis. As the total time span of the multiple segments increases, the spacing of the Doppler hypotheses in frequency must decrease. The net result is that each output for a given hypothesis of a given segment has to be weighted by the accumulated data phase flips times the accumulated Doppler phase $e^{j w_d T}$, where T is the time of a segment relative to the first segment.

VI. Implementation Example

A matched filter chip code-named "Magna" which combines some of the functionality of the sampling circuitry 308, the timing circuitry 307, and the matched filter 310 of FIGS. 8 and 10 has been developed by the assignee of the subject application (Conexant Systems, Inc. of Newport Beach, Calif.). A processor chip which embodies the functionality of the GPS processor 303 of FIG. 4 code-named "Scorpio", Part No. 11577-11, is available from the assignee of the subject application. In one implementation, the processor has additional GPS-specific circuits, such as tracking channels for continuously tracking a number of GPS satellite signals. Typically, the processor includes at least an embedded microprocessor with an external bus. In one configuration, the processor views the matched filter chip as a memory mapped peripheral. It issues commands to the matched filter chip, and retrieves results after it has completed processing for a given set of commands. An RF receiver chip which embodies the functionality of the GPS radio receiver 300 of FIG. 4 code-named "Gemini/Pices Monopack", Part No. R6732-13, is available from the assignee of the subject application. Additional details regarding this implementation example are available in U.S. Ser. No. 09/145,055, and Lyon & Lyon Dkt. No. 241/151, previously incorporated herein by reference.

In order to perform coherent integration over intervals greater than 20 ms, two things are required. First, one needs to know where the 50 Hz data bit edges, or data epochs (DE), occur. Second, the Doppler shift needs to be known to accuracy such that, over the coherent integration period, the phase angle of the desired signal does not change significantly.

The location of the data epochs can be known if the GPS time is known to an accuracy of less than 1 millisecond. This is possible because the GPS time is a time of week value and the 50 Hz data is aligned with week boundaries. If the GPS time is taken modulo 20 ms, the resulting value is the time within the current 20 ms long bit. Precise GPS time can be determined from a prior solution of the GPS navigation equations, or from an outside source, such as a mobile phone system having a timing relationship to GPS time. It is also the case that each 1 ms period of the PN code, or code epoch (CE), has a precise timing relationship to the data bits. Every $20^{th}$ CE is also a DE. Using this relationship, it is feasible to account for the location of the DE. This information is sufficient to allow coherent integration over 20 ms intervals. If, in addition, the value of the data bit is known, the integration can be extended for longer periods, limited only by Doppler shift and receiver movement.

Both Doppler shift uncertainty and receiver motion further limit the duration over which coherent integration is effective. At a resolution of about 62 Hz, the Doppler shift for a given operation of the matched filter cannot be more accurate than ±31 Hz. For an error of 31 Hz, the Doppler will cause a sign reversal in the real and imaginary components of the signal after 1/31=32 milliseconds. To perform Doppler hypothesis testing over longer periods than this with coherent integration requires a greater Doppler resolution than 62 Hz.

If it is required to coherently integrate over several 20 ms intervals, the Doppler Generator design should provide a Doppler shift resolution finer than 62 Hz. In general, if T is the coherent integration time in terms of actual elapsed time from the start of the first data capture to the start of the final data capture, the required Doppler shift resolution is 1/(2T). Thus, for a one second integration time, the required Doppler resolution is 0.5 Hz or better.

In addition to Doppler shift, the motion of the receiver must be considered. The wavelength of the GPS signal at L1 =1575.42 MHz is about 19 cm or 7.5 inches. If the receiver is in a hand held device, motion of half this distance will cause a phase inversion resulting in signal cancellation when using coherent integration. A person walking along at 4 mph will travel 3.75 inches in 53 milliseconds. Thus, a practical limit for even a slowly moving receiver may be only a few 20 ms periods. Nevertheless, if the values of the data bits are available, it is still beneficial to operate over several 20 ms periods with coherent integration in order to more rapidly improve SNR.

FIG. 10 illustrates an embodiment of Magna for processing coherent integrations. A first aspect is the output of the correlation adder tree, that is, circuitry 407. Instead of processing the 1 ms coherent integrations to compute the magnitude, the complex values are directly summed into the correlation array RAM storage 413. The size of the RAM accommodates the real and imaginary values rather than only the magnitude. Since non-coherent integration may still be required in some applications, this aspect is effected with a switch. In coherent mode, the magnitude calculation is bypassed.

A second aspect is the implementation of a register 438 to hold the value of the code epoch (CE) or subsegment at which the DE occurs. This value is provided by the external processor from its knowledge of GPS time. When the DE is encountered, the Incremental Doppler generator 401 receives the flip signal 440, which causes the complex phasor to flip its sign, thus preserving the coherent integration across the data bit boundary. The flip signal is controlled by the bit value 439. If the bit value does not cause a sign change, the flip signal-state does not change at the DE. The external processor provides the value of the bit. Note that each satellite will have a different DE and bit register value, set by the processor before the matched filter algorithm is run for that satellite.

The foregoing embodiments, implementations, and implementation examples achieve a much more rapid growth in signal to noise ratio (SNR) of correlation data through the coherent integration of incremental portions or subsegments of the samples. As a result, in the case in which the invention is incorporated into a GPS receiver, the result is that desired GPS satellites are detected more quickly. Moreover, power consumption is reduced due to the shorter time that the power detection circuit needs to be operational. Another result, in the case in which the GPS receiver is integrated with a mobile wireless phone, is increased call-time due to increased battery life.

In one example, to a first order, it has been found that, by using coherent integration, a signal detector in accordance with the invention is able to achieve a 3 dB improvement in SNR by increasing the processing time 200%. In contrast, a prior art signal detector employing non-coherent integration requires a 247% increase in processing time to achieve a 3 dB improvement in SNR. Moreover, this relationship is exponential. For example, to achieve a 6 dB improvement in SNR, it has been found that a signal detector in accordance with the invention requires a processing time increase of 400%, whereas a signal detector of the prior art requires a 610% increase in processing time.

Another advantage of the invention is that it takes advantage of cellular and PCS phone systems and their ability to provide external sources of data useful to GPS. This data includes precise time and frequency information, and direct or indirect information regarding data epochs (frame boundaries), and phase reversals at the frame boundaries as required for coherent integration.

Another advantage is that reliance on the matched filter of the subject invention to perform coherent integration reduces the load on the GPS processor. It also reduces the amount of RAM that the outside processor must dedicate to GPS.

Although embodiments and implementations have been described which utilize a GPS processor to perform various functions, it should be understood that embodiments are possible in which a generic processor is used to perform these functions. For purposes of this disclosure, a generic processor is defined to mean any device, including a computer, DSP, baseband processor, microprocessor, or microcomputer, which is capable of executing a discrete series of instructions stored in a memory accessible by the processor. It should also be understood that embodiments are possible in which analog circuitry is used to perform these functions.

While various embodiments of the application have been described, it will be apparent to those of ordinary skill in the art that many more embodiments and implementations are possible that are within the scope of the subject invention. Accordingly, the invention is not to be restricted except in light of the appended claims and their equivalents.

What is claimed is:

1. A signal detector comprising:
   a receiver for providing at least a segment of complex samples of a received signal, wherein the received signal comprises a desired signal perturbed by noise or pseudo-noise;
   a multiplier configured to multiply data derived from the segment with data representative of a hypothesis regarding at least a parameter of the desired signal, and for providing product data representative thereof; and
   a coherent integrator for coherently integrating the product data over a desired duration responsive to the location of a frame boundary of the desired signal as determined from a source other than the received signal, and deriving therefrom correlation data useful for detecting at least a parameter of the desired signal.

2. The signal detector of claim 1 in which the receiver is a radio frequency (RF) receiver.

3. The signal detector is claim 1 in which the signal of interest is a carrier signal modulated with a repeating PN code.

4. The signal detector of claim 1 further comprising a hypothesis generator for generating a plurality of hypotheses.

5. The signal detector of claim 1 further comprising a processor for receiving and analyzing the correlation data.

6. The signal detector of claim 1 in which the source is a cellular or PCS phone network.

7. The signal detector of claim 1 further comprising a phase detector for detecting phase reversals of the signal of interest, and the coherent integrator, responsive to the detection of a phase reversal, is configured to adjust for the phase reversal to allow coherent integration to proceed across a frame boundary.

8. The signal detector of claim 7 further comprising circuitry for, responsive to the detection of a phase reversal, flipping the sign of samples of the received signal.

9. The signal detector of claim 1 further comprising a frame boundary detector for detecting frame boundaries.

10. The signal detector of claim 9 wherein the coherent integrator, responsive to the detection of a frame boundary, is configured to non-coherently combine coherent integrations performed on either side of the frame boundary.

11. The signal detector of claim 9 wherein the coherent integrator, responsive to the detection of a frame boundary, is configured to derive first correlation data by coherently integrating the product data across the frame boundary under a first hypothesis which assumes the phase of the signal of interest is unchanged across the frame boundary, and to derive second correlation data by coherently integrating the product data across the frame boundary under a second hypothesis which assumes the phase of the signal of interest flips across the frame boundary.

12. The signal detector of claim 11 further comprising circuitry selecting one of the first and second correlation based on which of the two corresponding hypotheses is more likely.

13. A GPS receiver comprising a signal detector, wherein said signal detector comprises:

a receiver for providing at least a segment of complex samples of a received signal, wherein the received signal comprises a desired signal perturbed by noise or pseudo-noise;

a multiplier configured to multiply data derived from the segment with data representative of a hypothesis regarding at least a parameter of the desired signal, and for providing product data representative thereof; and a coherent integrator for coherently integrating the product data over a desired duration responsive to the location of a frame boundary of the desired signal as determined from a source other than the received signal, and deriving therefrom correlation data useful for detecting at least a parameter of the desired signal.

* * * * *